(12) United States Patent
Woodruff

(10) Patent No.: US 6,960,053 B2
(45) Date of Patent: *Nov. 1, 2005

(54) WINCH SYSTEM

(76) Inventor: Rollin Woodruff, 11698 N. Island Cove La., Portland, OR (US) 97217

( * ) Notice: Subject to any disclaimer, the term of this patent is extended or adjusted under 35 U.S.C. 154(b) by 0 days.

This patent is subject to a terminal disclaimer.

(21) Appl. No.: 10/431,340

(22) Filed: May 6, 2003

(65) Prior Publication Data
US 2004/0037664 A1 Feb. 26, 2004

Related U.S. Application Data

(63) Continuation-in-part of application No. 09/633,455, filed on Aug. 7, 2000, now Pat. No. 6,558,092.
(60) Provisional application No. 60/147,521, filed on Aug. 5, 1999.

(51) Int. Cl.$^7$ ................................................. B60P 7/08
(52) U.S. Cl. ............................ 410/12; 410/7; 410/19; 410/23; 410/103
(58) Field of Search ........................... 410/7, 9–12, 19, 410/21–23, 100, 103; 254/217, 218, 369

(56) References Cited

U.S. PATENT DOCUMENTS

| 1,145,217 A | 7/1915 | Sandifer |
| 1,513,129 A | 10/1924 | O'Connor |
| 2,989,267 A | 6/1961 | Mehl |
| 3,038,740 A | 6/1962 | Blunden |
| 3,860,263 A | 1/1975 | Taylor |
| 3,988,007 A | 10/1976 | Freiburger, Jr. |
| 4,234,166 A | 11/1980 | Cederblad |
| 4,273,484 A | 6/1981 | Blanar ........................ 410/12 |
| 5,145,299 A | 9/1992 | Stephenson, Jr. ........... 410/100 |
| 5,180,262 A | 1/1993 | Westerdale .............. 410/12 |
| 5,277,407 A | 1/1994 | Mayne et al. |
| 5,314,275 A | 5/1994 | Cottrell et al. ............... 410/26 |
| 6,558,092 B1 | 5/2003 | Woodruff ..................... 410/12 |
| 6,626,621 B1 * | 9/2003 | Hugg ......................... 410/103 |

* cited by examiner

Primary Examiner—Stephen Gordon
(74) Attorney, Agent, or Firm—Klarquist Sparkman, LLP

(57) ABSTRACT

A manually operated winch system secures cargo to a transport vehicle. The winch system has a shaft rotationally mounted relative a frame. A ratchet drive mechanism controls rotation of the shaft. A handle received in the drive mechanism can be used both to control rotation of the shaft and to control operation of a pawl. The drive mechanism is configured such that tilting the handle moves a member axially. Sufficient axial movement of the member causes the pawl to disengage mating ratchet teeth and thereby allows the shaft to rotate freely.

18 Claims, 15 Drawing Sheets

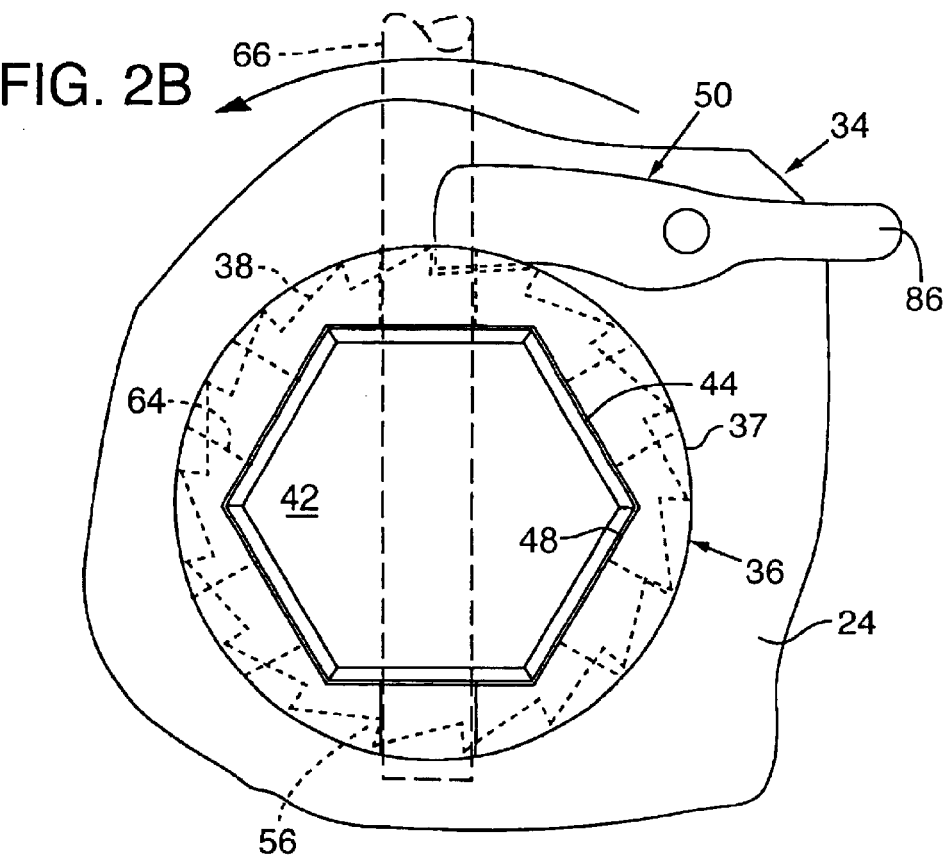
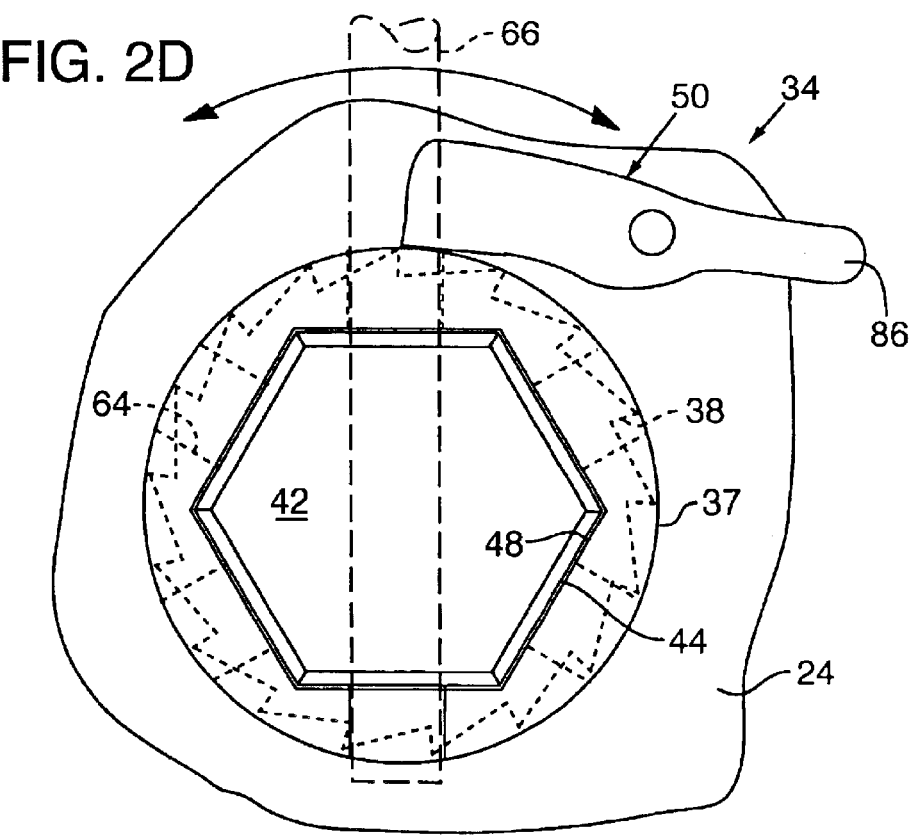

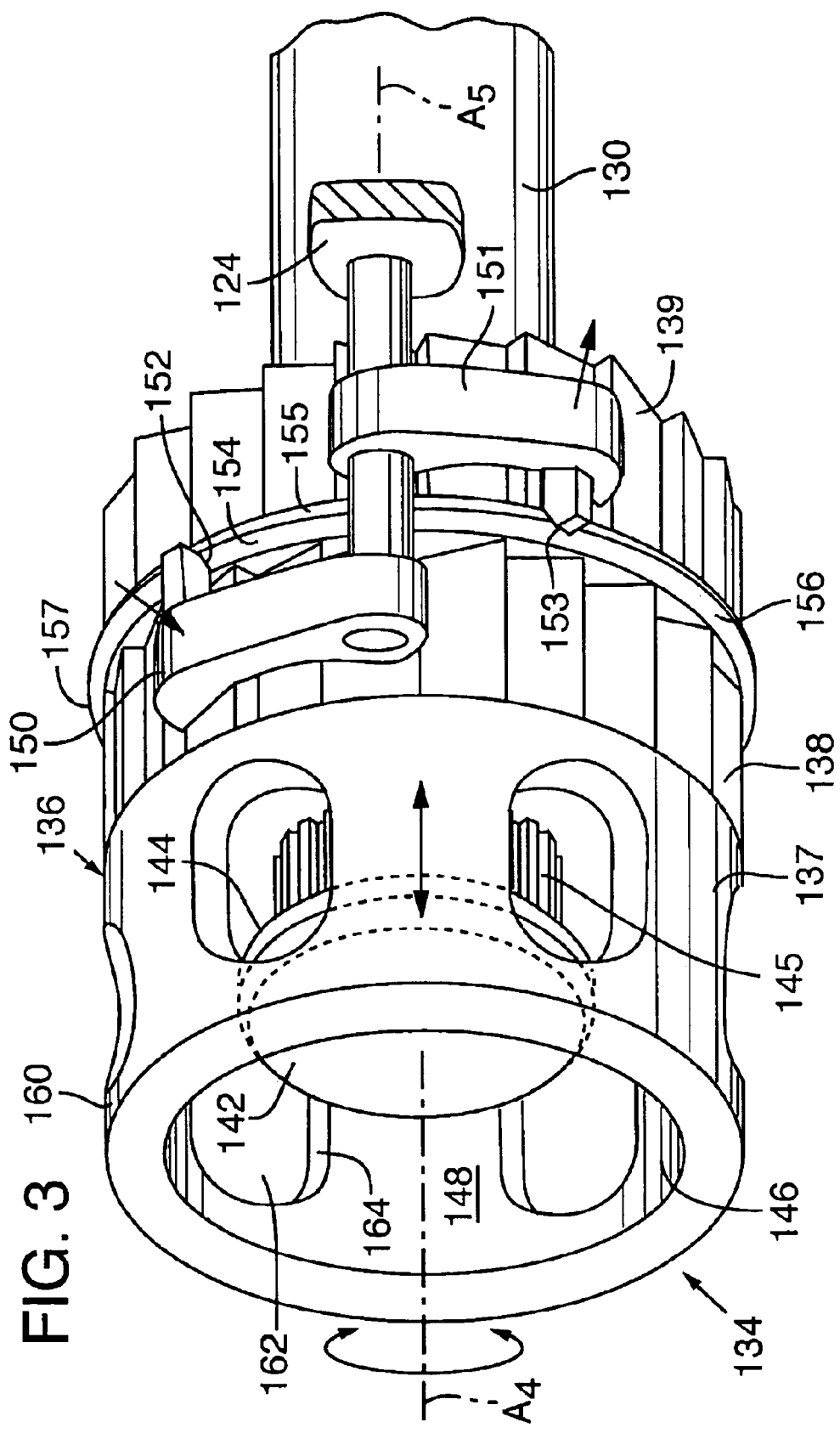

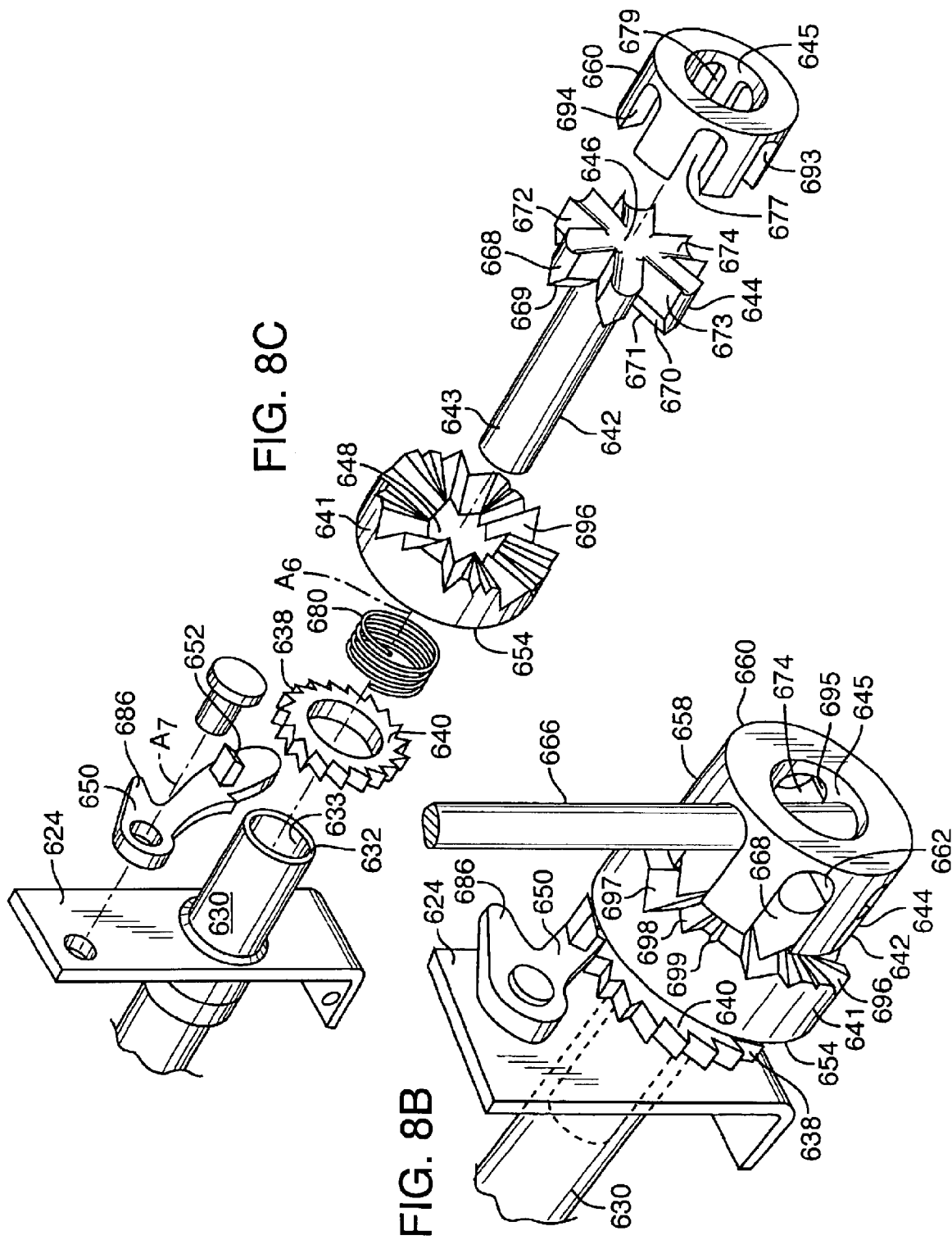

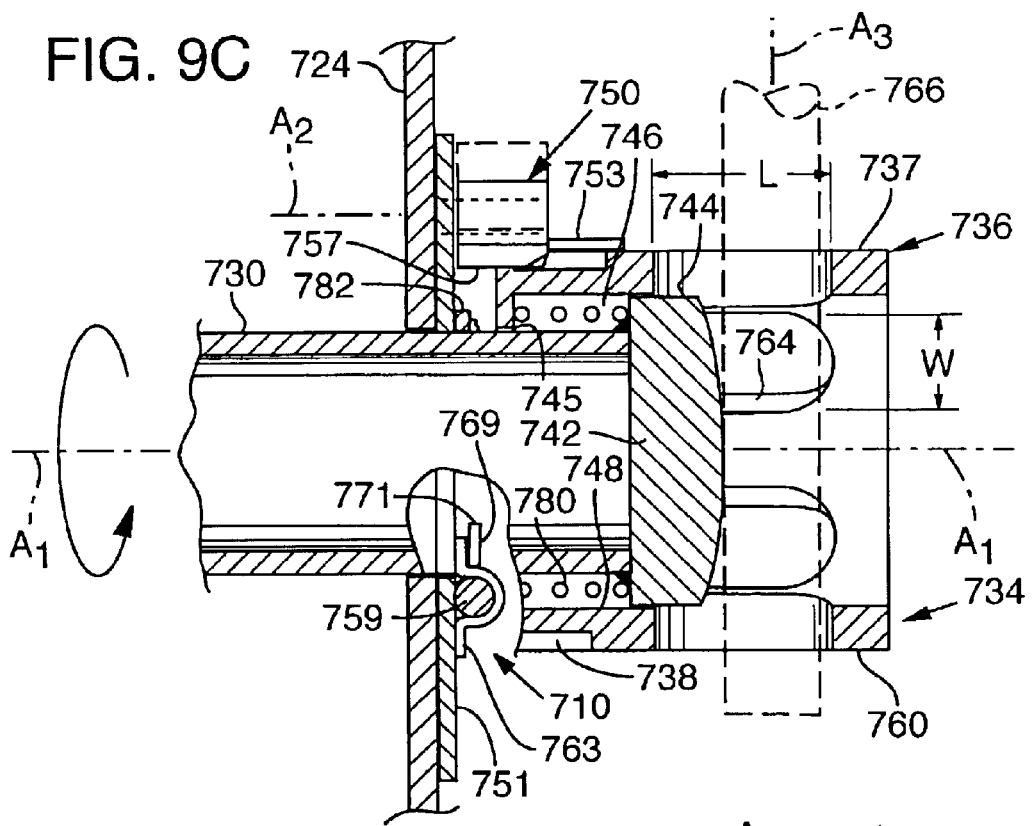
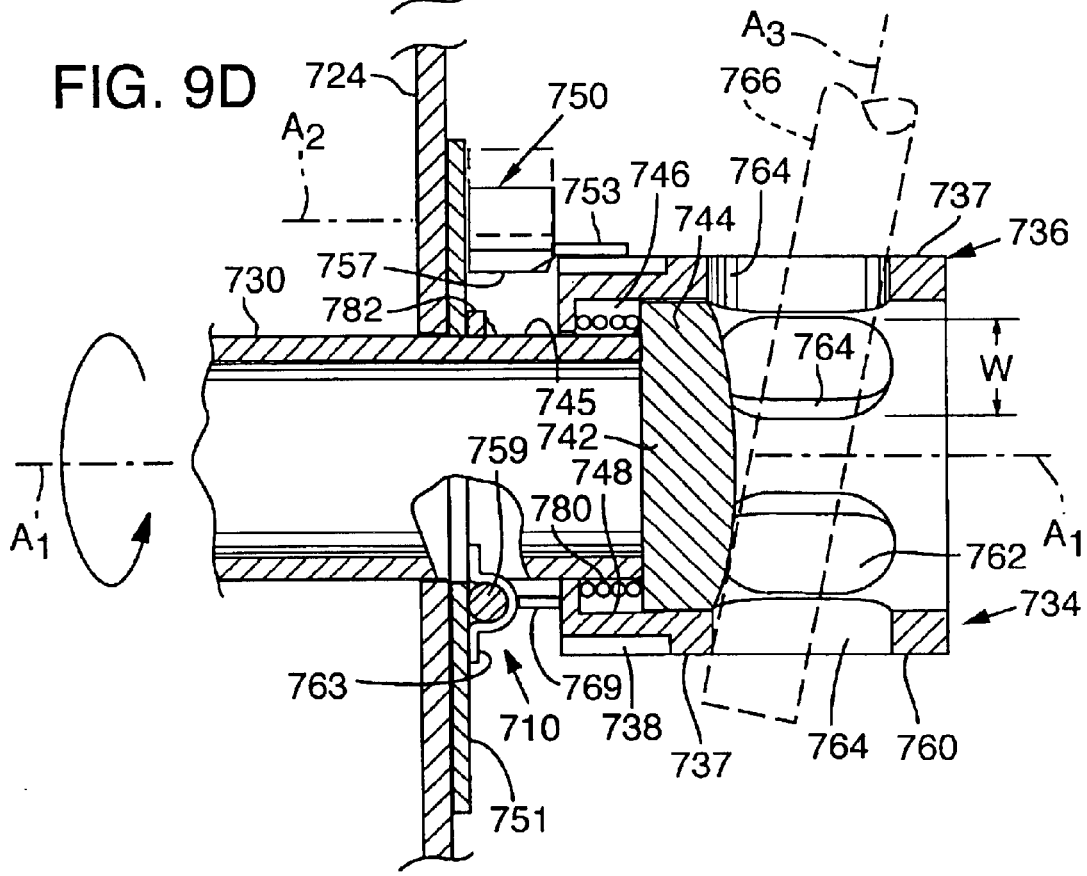

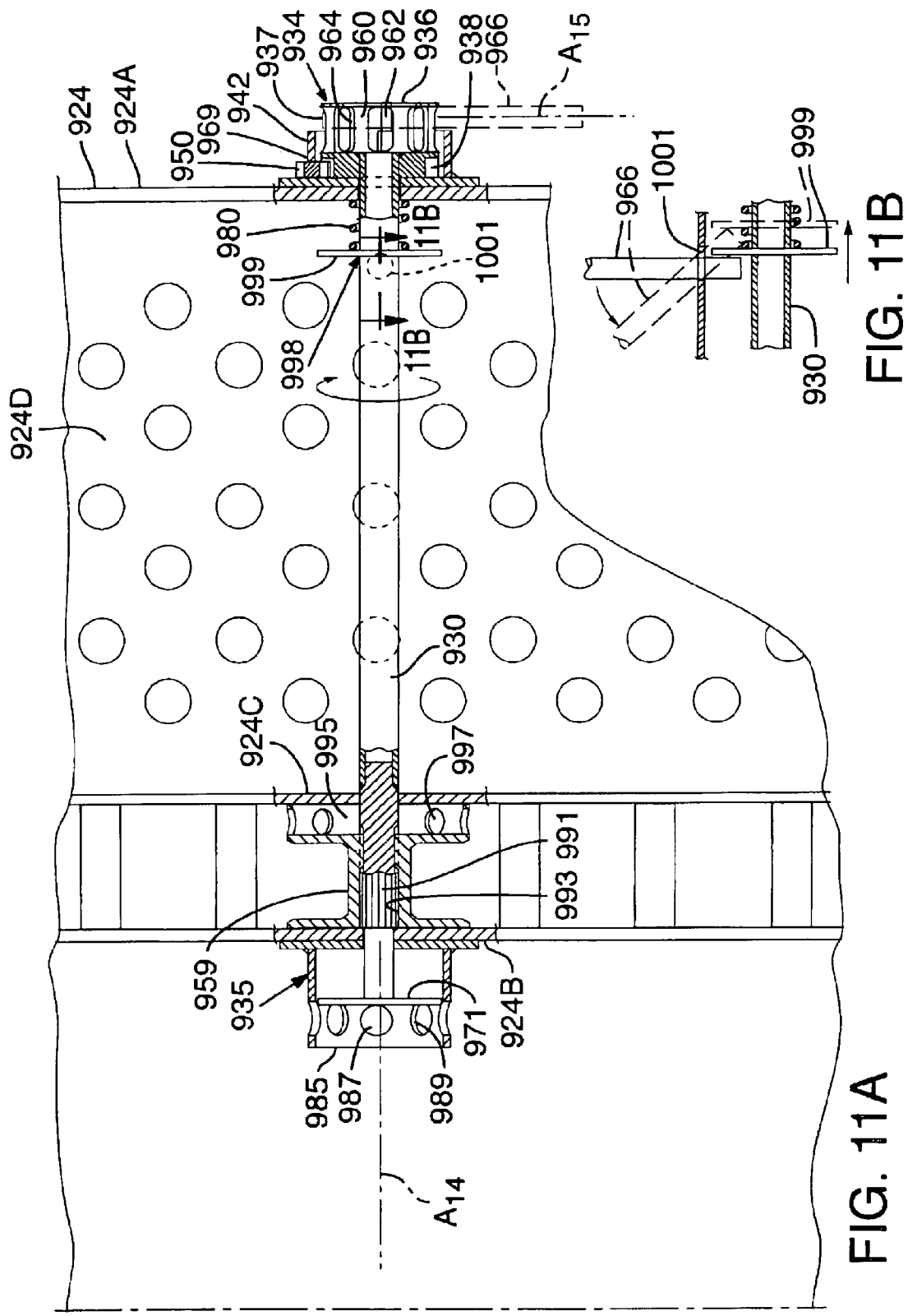

US 6,960,053 B2

WINCH SYSTEM

CROSS REFERENCE TO RELATED APPLICATIONS

This is a continuation-in-part of application No. 09/633,455, filed Aug. 7, 2000, now U.S. Pat. No. 6.558,092. which claims the benefit of U.S. Provisional Application No. 60/147,521, filed Aug. 5, 1999, both of which prior applications are incorporated herein by reference.

BACKGROUND AND SUMMARY

This disclosure concerns manually operated winches. In particular, the disclosure concerns winches of the type used to secure cargo on transplant vehicles such as trucks, trailers, railcars, ships and airplanes.

When heavy or bulky cargo needs to be secured for transport, it is common to use elongated members such as chains, ropes or belts to secure the cargo in place. The elongated members are typically tightened by hand-operated winches. For example, on a trailer designed to transport automobiles, it is typical to secure each automobile by means of a chain that is tightened by a hand-operated winch. Examples of prior winches are described in U.S. Pat. Nos. 3,038,740, 5,145,299, 5,180,262, and 5,314,275. Although such winches may have served their purposes, they have not been the most convenient or safe to operate.

Prior winches typically include a ratchet mechanism that can hold an elongated member taut. But, when an operator wishes to release tension on the elongated member, it is typically necessary for the operator to use one hand to operate a release lever while using the other hand to prevent the winch from free-spooling. This two-handed operation can be dangerous in cases where cargo has shifted during transit or is positioned such that it will move by gravity when the ratchet mechanism is released. For example, automobiles on transport trailers are typically positioned on ramps that are not horizontal so that gravity will urge an automobile to roll when its securing chain is detensioned. Typically, when unloading an automobile transporter vehicle, the operator must use one hand to release a winch ratchet mechanism while using the other hand to hold a handle in order to inhibit rotation of a winch spool on which the chain is wound. Thus, if an automobile begins to roll too rapidly, the operator may find it necessary to slow the movement of the automobile by resisting rotation of the winch spool single-handedly.

It can also be a problem that the release lever of a typical winch is not always easy to operate. If cargo has shifted during transit, a great deal of force may be exerted by the elongated member, which torques the shaft of the winch spool. This torque can jam elements of the ratchet mechanism into tight engagement so that a manually operated release lever is difficult to move. In such a situation, the operator may need to counter-rotate or back-off the spool a short distance in order to operate the release lever. When separate hands must be used to rotate the spool and operate the release lever, it is unnecessarily difficult to perform this operation.

Accordingly, there remains a need for winch mechanisms that can be operated easily, particularly ones that do not require the operator to use separate hands for separate operations.

Features and advantages of new winch systems will be understood by reference to the following detailed description and to the drawings to which it refers.

BRIEF DESCRIPTION OF THE DRAWINGS

In the drawings:

FIG. 2B is a vertical, sectional view taken along line 2B—2B of FIG. 2A.

FIG. 2D is a vertical, sectional view taken along line 2D—2D of FIG. 2C.

FIG. 3 is an oblique view of a second winch system.

FIG. 8B is an oblique view of the winch system shown in FIG. 8A.

FIG. 8C is an exploded view of the winch system shown in FIGS. 8A and 8B.

FIG. 9C is a vertical, sectional view taken along line 9C—9C of FIG. 9A showing a pawl in an engaged position.

FIG. 9D is a vertical, sectional view taken along line 9C—9C of FIG. 9A showing the pawl in a disengaged position.

FIG. 11A is a bottom plan view of an eleventh winch system installed below the deck of an automobile carrier vehicle, with portions in section to show internal structure.

FIG. 11B is a partial vertical elevational view of the eleventh winch system, with portions in section to show internal structure.

DETAILED DESCRIPTION

Figure 1:
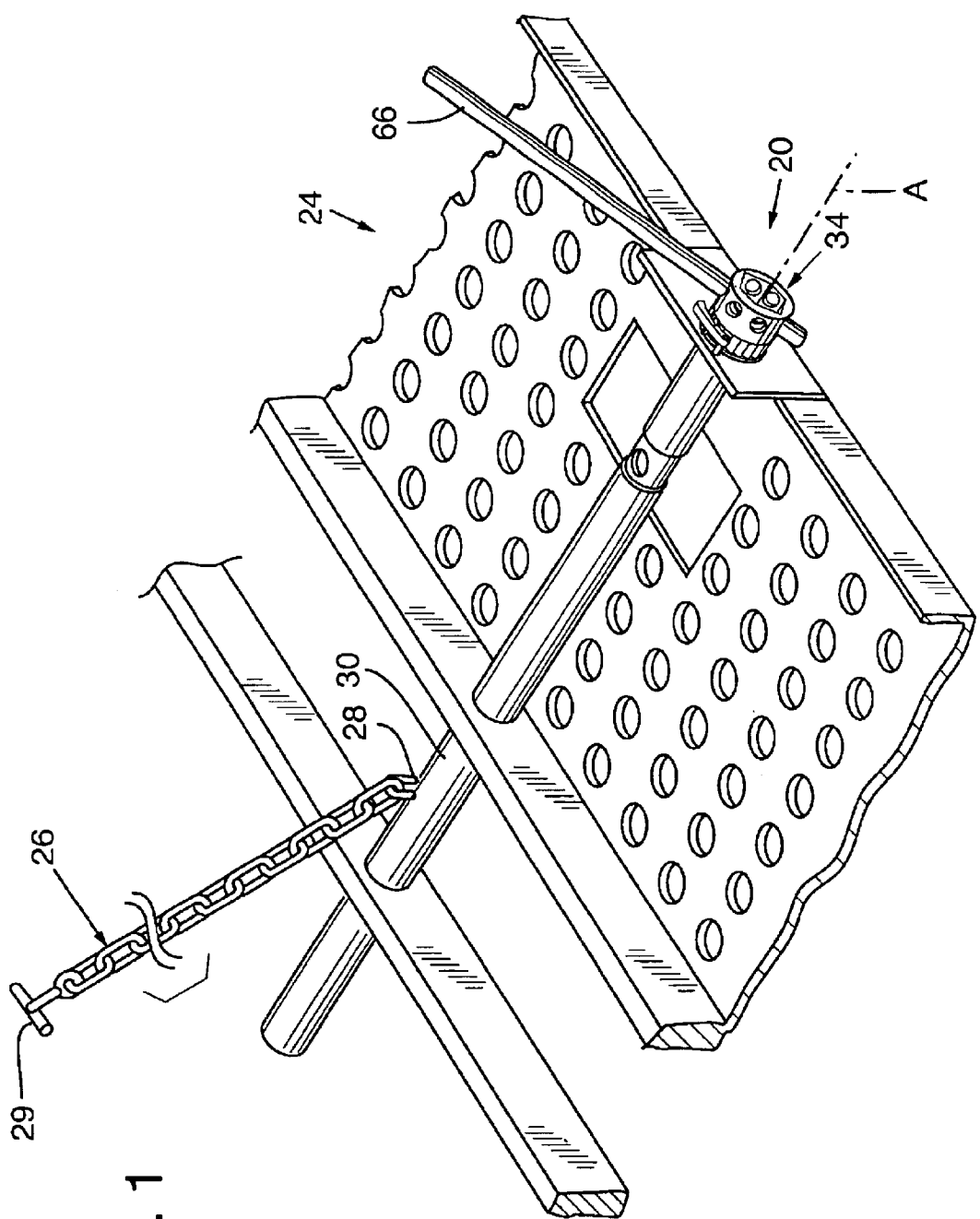
FIG. 1 is an oblique view of a portion of a trailer for transporting automobiles, including a winch system.

Winches are used to secure cargo to transport vehicles and for other purposes. In FIGS. 1–2 a winch system 20 is shown mounted to a frame 24 of a cargo carrying vehicle, in particular an automobile transport trailer. The cargo, for example automobiles, is secured to the transport vehicle by an elongated member 26. In the illustrated embodiment, the elongated member is a chain, but the elongated member could also be of another appropriate material such as rope, fabric webbing, cable, or wire rope. One end 28 of the elongated member is secured to a winch spool shaft 30. The other end 29 of the elongated member 26 is free so that the elongated member can be secured to the cargo, for example an automobile. Or the elongated member 26 can extend over or around the cargo with the free end 29 used to secure the elongated member to another portion of the transporting vehicle so that the elongated member encircles a portion of the cargo and holds it in place against the frame provided by the vehicle. Used in this second way, a winch can secure a cargo container or lumber, for example, to a railroad car, truck bed, or deck of a ship (not shown).

The shaft 30 is rotationally mounted relative to the frame 24. The shaft 30 can rotate about an axis $A_1$ of rotation to wrap the elongated member 26 around the shaft 30. The winch system 20 has a drive system 34 secured to the shaft 30 to control the rotation of the shaft.

In the embodiment of FIGS. 1–2, the drive system 34 is a unitary body 36 having a generally cylindrical exterior surface 37 that is coaxial with the axis $A_1$. The surface 37 defines a ring or series of ratchet teeth 38 evenly spaced around the axis $A_1$. The body 36 is mounted so that it can slide axially relative to the shaft 30 but can not rotate relative to the shaft 30 such that, when the body 36 is rotated about the axis $A_1$, the shaft 30 also rotates as indicated by curved arrows in FIGS. 2B and 2D. This is accomplished by providing a head or button 42 welded to an end of the shaft 30. The head 42 has a peripheral surface 44 that is cylindrical, is hexagonal in cross section, as shown in FIGS. 2B and 2D, and is at least partially received inside an axially extending cavity 46 defined inside the body 36 by an interior surface 48. The surface 48 is a cylinder having a hexagonal cross section of slightly larger dimensions than those of the surface 44. The hexagonal surface 44 and hexagonal surface 48 are sized and shaped to mate with each other so that the head 42 can move axially relative to the body 36, and such that the shaft 30 must rotate with the head 36. It will be appreciated that the cross-sections of the cylindrical surfaces 44, 48 need not be hexagonal in shape, but could be any other pair of mating cylindrical shapes, such as pentagons or more complex shapes (not shown), that allow the body of 36 to move axially, but not rotate independently of the shaft 30.

Figure 2A:
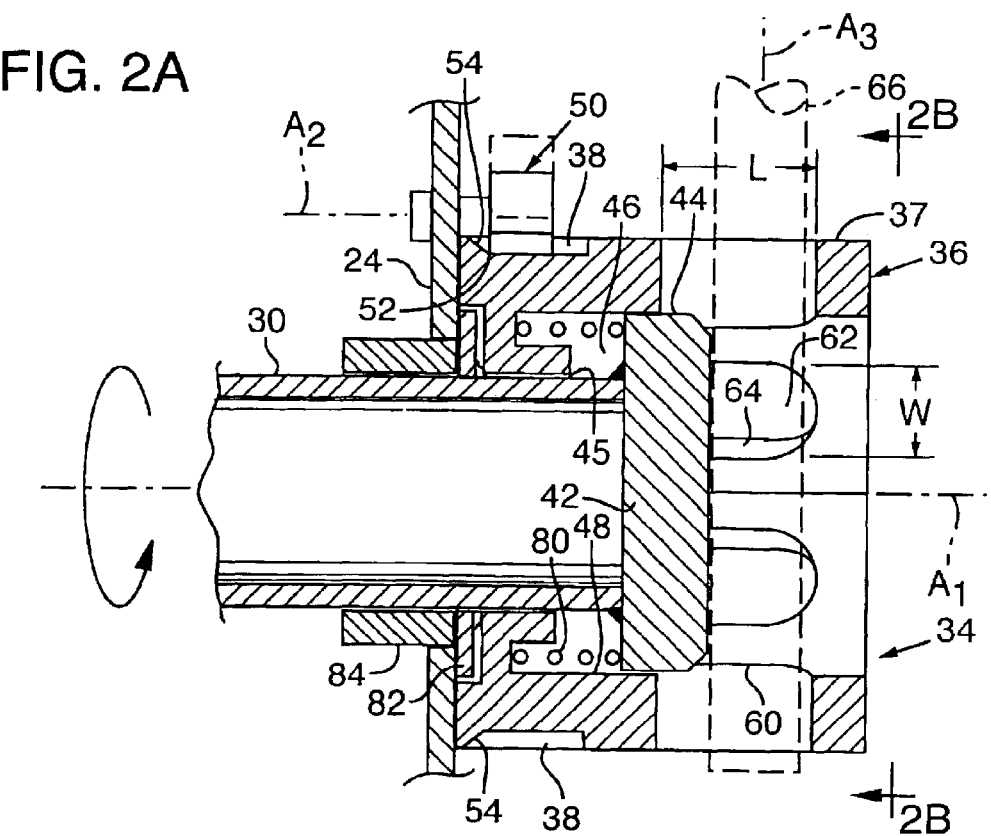
FIG. 2A is a vertical, sectional view of the winch system shown in FIGS. 1 showing a pawl in an engaged position.
Figure 2C:
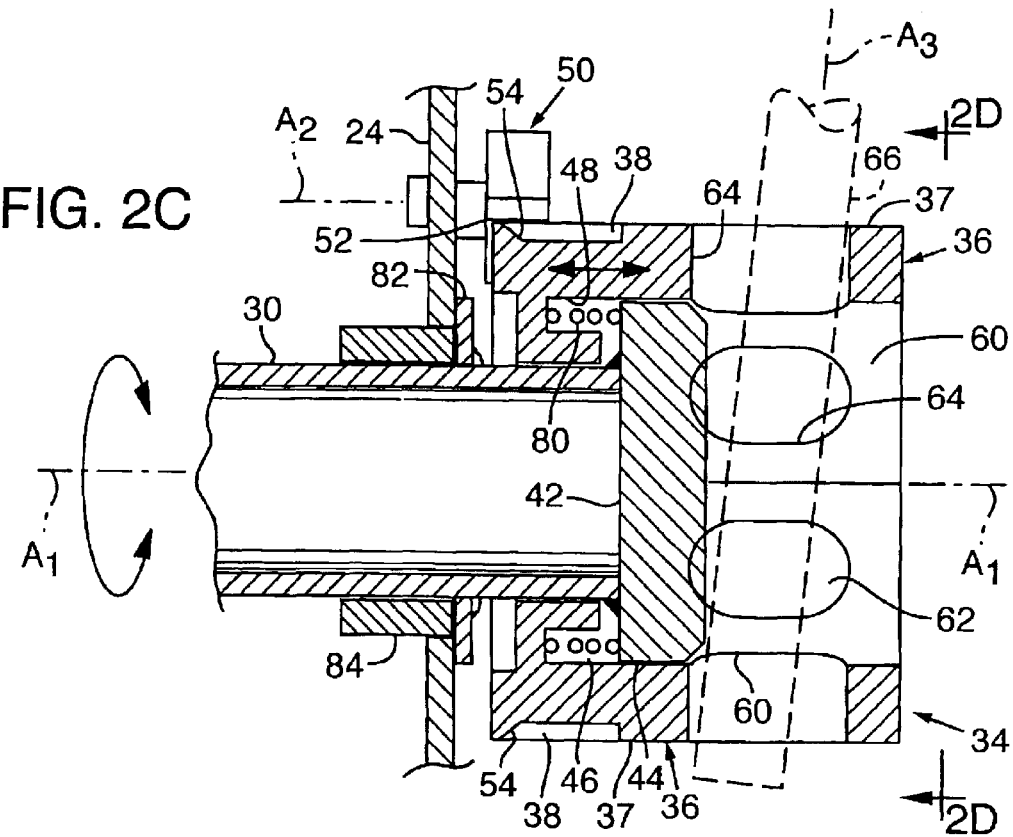
FIG. 2C is a vertical, sectional view of the winch system shown in FIGS. 1 showing the pawl in a disengaged position.

A pawl 50 is rotationally mounted on the frame 24 so that it can rotate about an axis $A_2$ between two positions. In FIGS. 2A and 2B, the pawl 50 is shown in an engaged position wherein the pawl engages the series of ratchet teeth 38 such that the shaft 30 can rotate only in one direction. The pawl 50 can be rotated about the axis $A_2$ to a disengaged position, for example as shown in FIGS. 2C and 2D, wherein the pawl does not engage the series of ratchet teeth 38. When the pawl 50 is in the disengaged position, the shaft 30 can rotate in both directions as illustrated by the two-headed arrow in FIG. 2D.

The pawl 50 has a contact surface that, in the embodiment of FIGS. 1–2, is an edge 52 on the side of the pawl nearest the frame 24. The body 36 has a pawl-engaging surface 54 positioned to engage the contact surface 52. In the embodiment of FIGS. 1–2, there are multiple pawl-engaging surfaces 54 provided by ramps located at the inner ends of valleys 56 defined between the teeth 38. As can be seen by comparing FIGS. 2A and 2B to FIGS. 2C and 2D, the body 36 is mounted so that the pawl-engaging surfaces 54 can move axially relative to the shaft 30 between a first location shown in FIGS. 2A and 2B and a second location shown in FIGS. 2C and 2D.

When the body 36 is in the first location, the pawl 50 is in the engaged position. When the body 36 is moved to the second location shown in FIGS. 2C and 2D, the contact surface 52 of the pawl 50 rides up, away from the axis $A_1$, on one of the ramps 54 such that movement of the pawl-engaging surfaces 54 between their first and second locations causes the pawl 50 to rotate between the engaged and disengaged positions.

The drive system 34 also has a handle-engaging portion 60. The illustrated handle-engaging portion 60 includes a series of radial openings 62 that are defined by interior surfaces 64 and are sized and shaped to receive a rod-like handle 66 that may be inserted by an operator through a pair of opposed openings 62. Each opening 62 has a length L measured parallel to the axis $A_1$ and a width W measured perpendicular to a plane (not shown) that bisects the opening and includes the axis $A_1$. The length L is greater than the width W. Ideally, the length L is considerably larger than the diameter of the handle 66, whereas the width W is only slightly larger than the diameter of the handle 66. Thus, when a handle 66 is inserted into openings 62, the handle can move axially through the openings parallel to the axis $A_1$ to a limited extent, and can not rotate to any great extent relative to the body 36 about the axis $A_1$.

When a handle is inserted into the body 36, the operator can use the handle to apply rotational force in the directions shown by arrows in FIGS. 2B and 2D. The force is transmitted from the handle to the shaft 30 via the body 36. Thus, by applying a torquing force to the handle 66, the operator will urge the shaft 30 to rotate.

The handle 66 can also be used as a lever (first or second class depending on the direction of tilt) to transmit axially directed force that causes the pawl-engaging surfaces 54 to move from their first locations to their second locations. When the handle 66 is tilted toward or away from the frame 24 so that the longitudinal axis $A_3$ of the handle changes in angle relative to the axis $A_1$, a portion of the handle 66 pushes on the head 42 while another portion of the handle 66 pushes on an interior surface 64 that defines one of the radial openings 62. Thus, in the embodiment of FIGS. 1–2, tilting the handle 66 toward or away from the frame 24 pulls the body 36 outwardly away from the frame and causes the pawl-engaging surfaces 54 to move laterally relative to the frame 24 from their first locations to their second locations. (The head 42 serves as a fulcrum when an end of the handle 66 is pulled away from the frame 24 as shown in FIG. 2C. Thus, when the handle 66 is moved in that way, it acts as a second class lever.)

When the handle 66 is moved laterally to the position shown in FIGS. 2C and 2D, the pawl 50 is disengaged so the operator can rotate the body 36 in either direction about the axis $A_1$. In turn, the shaft 30 rotates about the axis $A_1$ in the direction that the handle is rotated. It thus can be seen that the operator can both disengage the pawl 50 and cause the shaft 30 to rotate while maintaining both hands firmly gripped on the handle 66.

A return spring 80 is provided between the body 36 and head 42 to urge the body and pawl-engaging surfaces to return to the first location. This is helpful to assure that the pawl 50 will normally be in the engaged position to prevent inadvertent free-spooling of the shaft 30. A stop plate 82 is welded to the shaft 30 to prevent the shaft 30 from shifting axially relative to the frame 24. Another device could be used, instead of the plate 82, to limit axial movement of the shaft 30. Bushings 84 or other types of bearings may be provided to inhibit binding of the shaft 30. Although not normally needed, a release handle 86 may be provided on the pawl 50.

A second embodiment is shown in FIG. 3. This embodiment is similar to the embodiment shown in FIGS. 1–2 in many ways, but the mechanism of the embodiment of FIG. 3 allows for both clockwise and counterclockwise ratcheted rotation. As in the embodiment of FIGS. 1–2, a winch spool shaft 130 is rotationally mounted relative to a frame 124. The shaft 130 can rotate about an axis $A_4$. A drive system 134 is secured to the shaft to control the rotation.

The drive system 134 is a unitary body 136 having a generally cylindrical exterior surface 137 that is coaxial with the axis $A_4$. The surface 137 defines a first ring or series of ratchet teeth 138 and a second ring or series of ratchet teeth 139. The teeth of each series are evenly spaced around the axis $A_4$. The body 136 is slidably mounted relative to the shaft in such a manner that when the body 136 is rotated about the axis $A_4$, the shaft also rotates.

A head or button 142 is welded or otherwise secured to the end of the shaft and is at least partially received inside an axially-extending cavity 146 defined inside the body 136 by an interior wall surface 148. A portion of the shaft 130, between the frame 124 and the head 142, has a peripheral surface that is cylindrical. One or more axially extending splines 145 are provided along the surface. The splined surface is at least partially received inside a mating, axially extending bore defined through the body 136. The interior surface of the bore is a cylinder having grooves that mate with the splines 145 and has a cross section of slightly larger dimensions than those of the splined surface portion. Thus the splined surface and the bore are sized and shaped to mate with each other such that the body 136 can move axially relative to the shaft 130, and such that the shaft 130 must rotate with the body 136. It will be appreciated that the cross-sections of the splined shaft portion and the bore need not be of the illustrated shape, but could be any other pair of mating cylindrical shapes that allow the body 136 to move axially, but not rotate independently of the shaft 130.

A first pawl 150 and a second pawl 151 are rotationally mounted on the frame 124 for movement between engaged and disengaged positions. Most efficiently, both pawls are mounted to rotate about a common axis $A_5$. FIG. 3 shows the first pawl 150 in its engaged position wherein the pawl engages the first series of ratchet teeth 138 such that the shaft 130 can rotate in only one direction (counterclockwise as viewed in FIG. 3). The first pawl 150 can be moved to its disengaged position (not shown) wherein the first pawl 150 does not engage the first series of ratchet teeth 138. Similarly, the second pawl 151 is moveable between an engaged position (not shown) wherein the second pawl engages the second series of ratchet teeth 139 and a disengaged position, shown in FIG. 3, wherein the second pawl 151 does not engage the second series of ratchet teeth 139. When the pawl 151 is in its engaged position, the shaft 130 can rotate in only the opposite direction (clockwise as viewed in FIG. 3).

The first pawl 150 has a first contact surface 152. The second pawl 151 has a second contact surface 153. The contact surfaces 152, 153 are positioned to engage first and second annular pawl-engaging surfaces 154, 155 provided on the body 136. The body 136 is mounted so that, when the body is moved axially relative to the shaft, both pawl-engaging surfaces 154, 155 move axially between first locations and second locations. The pawl-engaging surfaces 154, 155 are provided on an annular ring 156, the surfaces 154, 155 serving as two sloping ramps which meet at an annular ridge 157 that is the outermost edge of the ring.

When the body 136 is in its first location (nearest the frame 124 or to the right as shown in FIG. 3), the first pawl 150 is in its engaged position and the second pawl 151 is in its disengaged position. When the body 136 is moved to its second location (away from the frame 124 or to the left in FIG. 3), the contact surface 152 of the first pawl 150 rides up on the pawl-engaging surface 154 which causes the first pawl 150 to move away from the axis A4 from its engaged to its disengaged positioned. Simultaneously, the contact surface 153 of the second pawl 151 slides down on the surface 155 towards the axis $A_4$ so that the second pawl 151 moves from its disengaged position to its engaged position. The illustrated pawls 150, 151 are urged by gravity to engage the teeth 138, 139, but it should be understood that any of the pawls described herein could be biased toward corresponding ratchet teeth by means of a spring or other such biasing device. A return spring can be provided to urge the body 136 to return to the first location so that the pawl 150 will normally be in the engaged position and the pawl 151 will normally be in the disengaged position.

Depending upon the axial spacing of the surfaces 152, 153 relative to each other, it is possible to vary the operation of the pawls 150, 151. If the surfaces 152, 153 are sufficiently spaced apart axially, both pawls 150, 151 will contact their corresponding ratchet teeth 138, 139 when the body 136 is in an intermediate location. With this arrangement, the shaft can be locked against rotation in either direction. If the surfaces 152, 153 are sufficiently close together or overlapped axially, neither of the pawls 150, 151 will engage the ratchet teeth 138, 139 when the body 136 is in an intermediate location, which will create a free spool condition. It is also possible to space the surfaces 152, 153 so that, as the body 136 is moved laterally relative to the frame 124, the movements of the pawls 150, 151 are coordinated such that as one of the pawls is releasing, the other pawl is engaging so that there is a virtually seamless shift from clockwise rotatably to counterclockwise rotatably without passing through an intermediate free spool or completely locked condition.

The drive system 134 also has a handle-engaging portion 160. The illustrated handle-engaging portion 160 includes a series of radial openings 162 that are defined by interior surfaces 164. The openings 162 are sized and shaped to receive a handle (not shown) that may be inserted by the operator through a pair of opposed openings 162. When such a handle is inserted, the operator can use the handle to apply rotational and axially directed forces in the manner described above in relation to the system shown in FIGS. 1–2. By tilting the handle laterally, toward or away from the frame 124, the operator can move the body 136 between its first and second locations. By pulling the handle laterally outwardly (to the left in FIG. 3), the body 136 is moved to a position wherein the first pawl 150 is disengaged and the second pawl 151 is engaged so that the shaft can be rotated in a clockwise direction (as viewed from the left). By moving the handle to a location where its axis is more nearly parallel to a plane that is perpendicular to the axis $A_4$, the body 136 moves toward the frame 124 (to the right in FIG. 3), the first pawl 150 engages the teeth 138, and the second pawl 151 disengages the teeth 139 so the shaft 130 can rotate only counterclockwise (as viewed from the left). It should be appreciated that the operator need not take one hand off the handle in order to disengage pawls 150, 151 as needed.

Figure 4A:
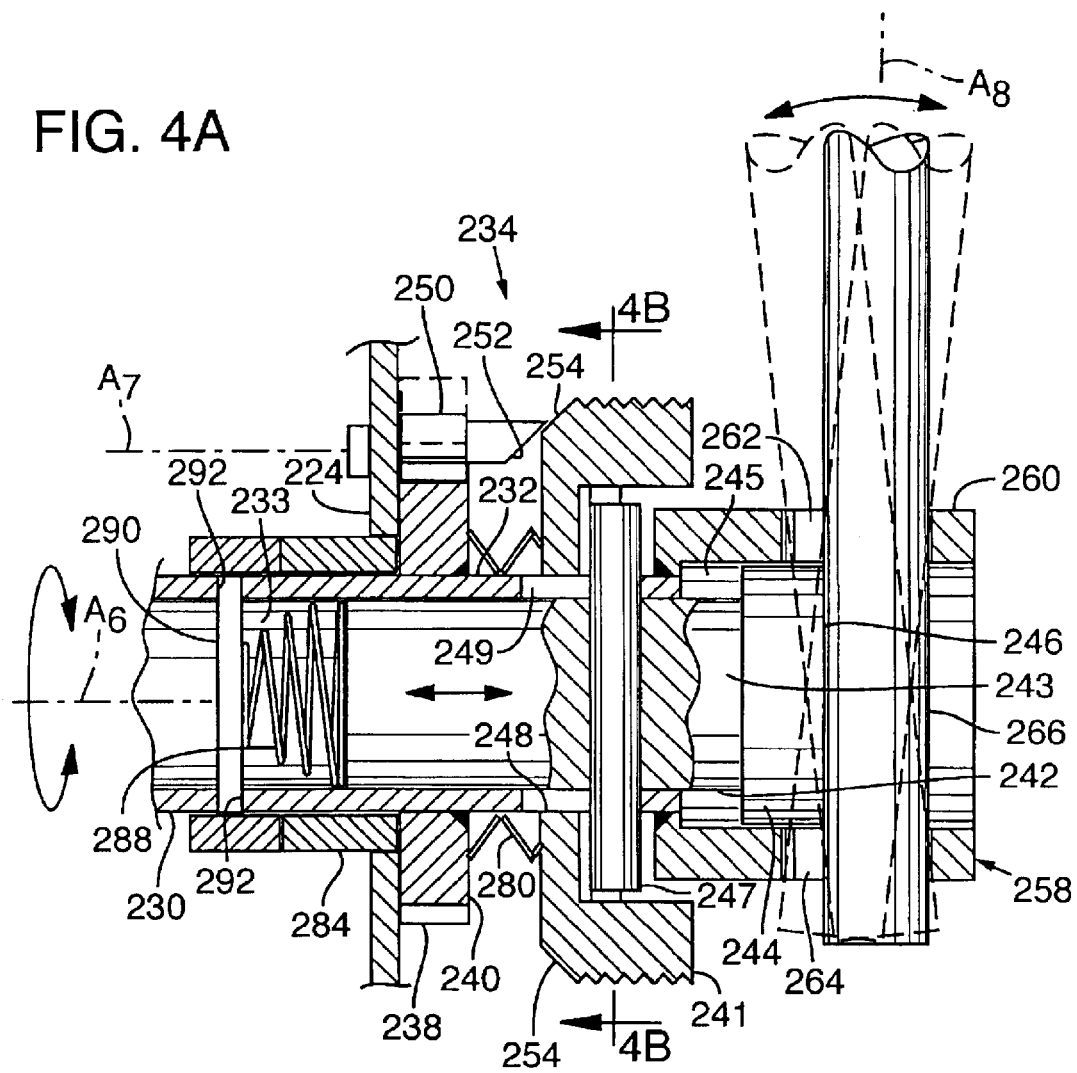
FIG. 4A is a vertical, sectional view of a third winch system.
Figure 4B:
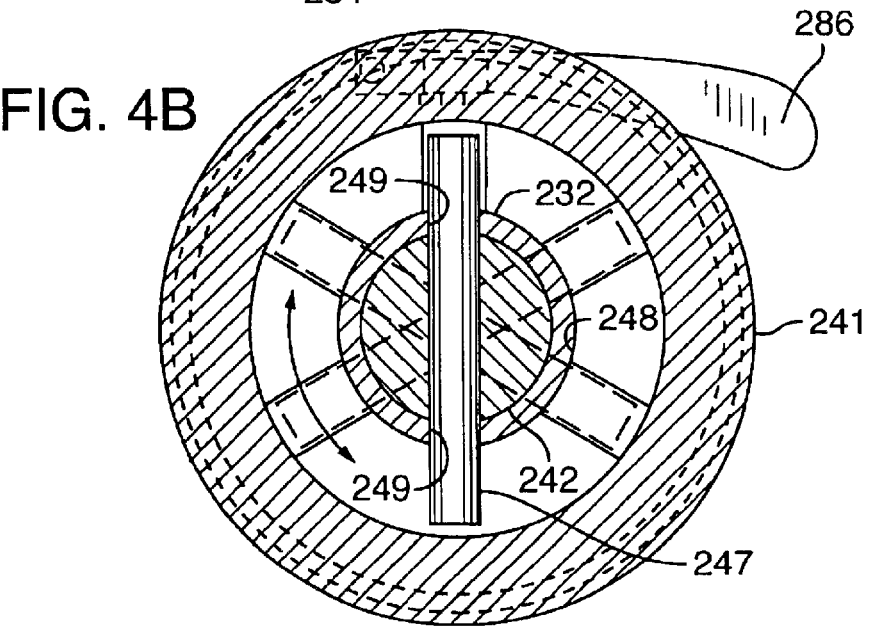
FIG. 4B is a vertical, sectional view taken along line 4B—4B of FIG. 4A.

FIGS. 4A and 4B illustrate another winch system that can be operated entirely by a single handle. The winch system of FIGS. 4A and 4B, and several other winch systems described below, include a drive system that is a multi-part assembly having a piston that is movable axially to disengage a pawl.

The winch of FIGS. 4A and 4B has a spool shaft 230 mounted for rotational movement relative to a frame 224. The shaft 230 can rotate about an axis $A_6$ to wrap an elongated member around the shaft 230. An end portion of the shaft 230 is comprised of a cylindrical wall 232 that defines a central bore 233.

A multi-part drive system 234 is provided to control the rotation of the shaft 230. The drive system 234 includes a series of ratchet teeth 238 evenly spaced around the axis $A_6$. In the illustrated embodiment, the ratchet teeth are on the perimeter of a ratchet wheel 240 that is welded to the shaft 230 so that the ratchet teeth 238 rotate about the axis $A_6$ as the shaft 230 rotates.

A pawl 250 is rotatably mounted relative to the frame 224 so that it can move about an axis $A_7$ between two positions. In FIGS. 4A and 4B, the pawl 250 is shown in an engaged position wherein the pawl engages the series of ratchet teeth 238 such that the shaft 230 can rotate only in one direction. The pawl 250 can be rotated to a disengaged position (not shown) wherein the pawl does not engage the series of ratchet teeth 238. When the pawl 250 is in the disengaged position, the shaft 230 can rotate in both directions. The pawl 250 has a contact surface 252 that extends axially outwardly from the pawl 250 at an angle to the axis $A_7$.

A release member 241 is mounted to slide axially relative to the shaft 230. The illustrated release member 241 is generally in the shape of a ring concentric to the shaft 230. The release member 241 has a central opening that is defined by a cylindrical wall 248 and that receives the shaft 230. The release member 241 also has an annular pawl-engaging surface 254 positioned to engage the contact surface 252. The member 241 is mounted for movement between a first location, shown in FIG. 4A, wherein the pawl-engaging surface 254 does not exert force on the pawl 250 and a second location (not shown, moved to the left as viewed in FIG. 4A) wherein the pawl-engaging surface 254 supports the pawl 250 in a position where the pawl is disengaged from the ratchet teeth 238. Thus, when the release member 241 is in its first location (illustrated), the pawl is in the engaged position. Movement of the pawl-engaging surface 254 between its first and second locations causes the surface 252 to slide on the surface 254 and thereby causes the pawl 250 to move between its engaged and disengaged positions.

The drive system 234 includes a driver head or handle-engaging member 260. The illustrated handle-engaging member 260 is a cage that is welded or otherwise secured to the shaft 230. The driver head 260 has multiple radial openings 262 that are defined by interior surfaces 264 and that are sized and shaped to receive a handle 266 that may be inserted by an operator through a pair of openings 262 on opposite sides of the axis $A_6$. The openings 262 are axially elongated and have sufficiently large axial dimensions that a handle 266 received in a pair of the openings can be tilted to vary the angle of the handle relative to the axis $A_6$.

The illustrated driver head 260 is an assembly that includes a slidably mounted piston 242 for transmitting axially directed force from the handle 266 to the release member 241. The piston 242 has a body portion 243 that extends into the bore 233 of the hollow shaft 230 and a head portion 244 located outside the bore 233 at the outer end of the body portion 243. In the embodiment of FIGS. 4A and 4B, the head portion 244 of the piston 242 is contained in a bore 245 that is defined by the handle-engaging member 260 and that extends substantially parallel to the axis $A_6$. The head portion 244 has an outwardly facing contact surface 246 for contact with the handle 266. The surface 246 may be at least partially convex or have chamfered edges (not shown) to reduce the amount of force required to tilt a handle that is in contact with the surface 246.

Plural projections extend radially from the piston 242. In the embodiment of FIGS. 4A and 4B, the projections are two ends of a pin 247 that extends radially through the piston 242. The cylindrical wall 232 of the shaft 230 defines two opposed axially extending openings or slots 249 defined in opposite sides of the hollow shaft 230. The slots receive the projections and have sufficiently large axial dimensions that the projections can travel axially along a path provided by the slots. The slots 249 allow the piston 242 and pin 247 to move axially, but not to rotate to any great extent relative to the shaft 230.

A first return spring 280 is provided between the ratchet wheel 240 and the release member 241. The spring 280 is sized and positioned to urge the release member 241 to move axially to its first location, distant from the frame 224. This is helpful to assure that the pawl 250 will normally be in its engaged position, received between two of the ratchet teeth 238, so that the shaft 230 can rotate in only one direction and so that inadvertent free-spooling of the shaft 230 is prevented.

If the first return spring 280 is not sufficiently strong, by itself, to move the release member 241 outwardly or if a fail-safe mechanism is desired, a second return spring 288 can be provided to urge the piston 242 to move outwardly from the frame 224 as well. The illustrated spring 288 is located inside the cavity of the shaft 230 between the inner end of the piston 242 and a stop member 290 secured to the shaft 230. In the embodiment of FIG. 4A, the stop member 290 is a bar or pin that extends across the interior of the shaft 230 between axial holes 292 drilled through opposite sides of the shaft. Bushings 284 or other types of bearings can be provided to inhibit binding of the shaft 230. Although not required, a release handle 286 can be provided on the pawl 250 if desired.

To operate the winch of FIGS. 4A and 4B, a user inserts a handle 266 through a pair of opposed openings 262. The handle 266 can then be used both to move the pawl 250 between its engaged and disengaged positions and to rotate or limit the rotation of the shaft 230.

Engagement of the pawl 250 is controlled by tilting the handle 266 laterally, toward or away from the frame 224. This can be accomplished by pushing a distal portion of the handle 266 (to the left or right as viewed in FIG. 4A) such that the handle moves substantially in a plane (such as the sectional plane of FIG. 4A) that bisects an opening 262 and that includes the axis $A_6$. Initially, when the handle 266 is inserted, it extends substantially perpendicularly to the axis $A_6$. When the handle 266 is tilted away from perpendicular, so that the longitudinal axis $A_8$ of the handle changes in angle relative to the axis $A_6$, a portion of the handle 266 pushes on the head 244 of the piston 242 while another portion of the handle 266 pushes on an interior wall 264 that defines one of the openings 262 and that serves a fulcrum. This lever action (first or second class depending on the direction of handle tilt) causes the piston 242 to move axially toward the frame 224.

The pin 247 is carried by the piston and is moved axially with the piston, as the handle 266 is tilted, until the pin engages the release member 241. Further axial movement of the handle 266 thus moves the release member 241 due to force applied by the pin 247. Eventually, motion of the pin 247 towards the frame 224 pushes the release member 241 sufficiently to cause the pawl-engaging surface 254 to move laterally toward the frame 224 until the pawl-engaging surface 254 contacts the contact surface 252. The release member 241 and its pawl-engaging surface 254 are shaped and positioned such that force transmitted from the handle 266 is then transmitted to the contact surface 252. As the release member 241 moves to its second position (not shown), the surface 254 pushes on the surface 252 so that the surface 252 rides up on the surface 254 and the free end of the pawl 250 moves away from the axis $A_6$. Eventually the pawl-engaging surface 254 travels along the contact surface 252 to a sufficient extent that the pawl 250 is rotated away from the ratchet teeth 238 and the ratchet mechanism is disengaged.

Axially directed force thus can be transmitted from the handle 266 to cause the pawl-engaging surface 254 to move from its first location to its second location. In particular, when the handle is moved laterally to the left, to the position shown by broken lines in FIG. 4A, the pawl 250 is disengaged. When the handle 266 is returned to a position where it is perpendicular to the axis $A_6$, the return springs 280, 288 push the release member 241 away from the frame 224 and the pawl 250 returns to its engaged position.

The operator also can use the handle 266 to apply a rotational or torquing force in either direction shown by the curved arrow in FIG. 4B to urge the shaft 230 to rotate about the axis $A_6$. Force is transmitted from the handle 266 to the shaft 230 via the handle-engaging member 260. While the pawl 250 is in its disengaged position the operator can use the handle 266 to rotate the handle-engaging member 260 in either direction about the axis $A_6$. When the pawl is in its engaged position the shaft 230 can be rotated in only one direction (counterclockwise as viewed in FIG. 4B).

It thus can be seen that an operator can simultaneously apply a rotational force to the shaft 230 and control engagement of the pawl 250 while maintaining both hands firmly gripped on the handle 266.

Figure 5:
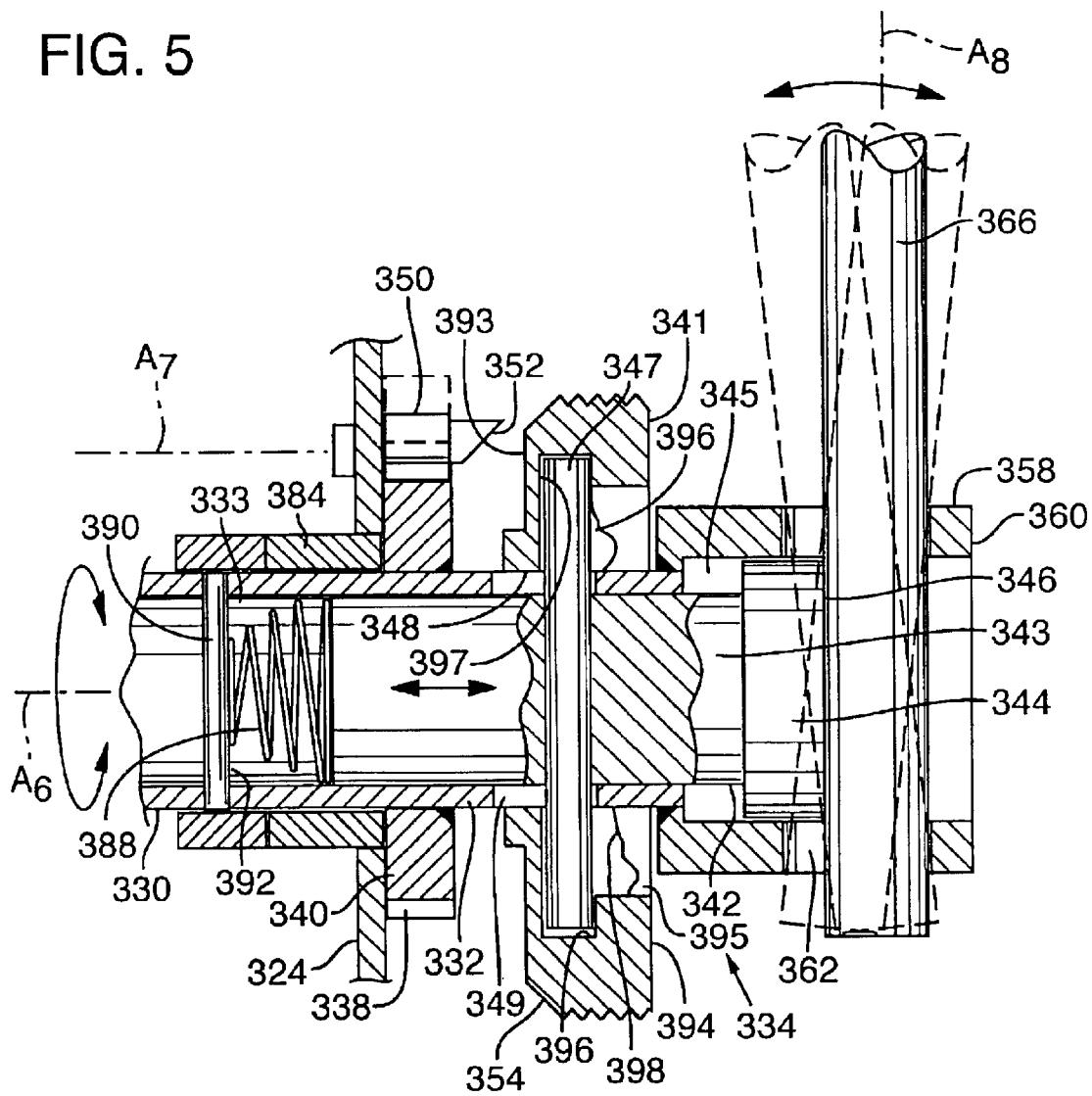
FIG. 5 is a vertical, sectional view of a fourth winch system.

FIG. 5 shows a winch system that in many aspects is similar to the system shown in FIGS. 4A and 4B. Comparable elements in FIG. 5 are indicated by the same reference numerals used in FIGS. 4A and 4B, incremented by one hundred. The system of FIG. 5 is advantageous in that it includes an adjustment system for control of the engagement of a pawl 350. Adjustment is accomplished by providing a release member 341 that has an inwardly facing surface 393 that faces toward a frame 324, an outwardly facing surface 394 that faces away from the frame, and a generally cylindrical, axially extending surface 395 that is located between the surfaces 393, 394 and that encircles the axis $A_6$. The surface 395 defines a circumferential channel 396 that opens toward and is generally concentric with the axis $A_6$. Ends of a pin 347 are contained in the channel 396 so that axial movement of a piston 342 causes the pin 347 and the release member 341 to move.

The channel 396 has radially extending walls 397, 398 that do not lie in planes perpendicular to the axis $A_6$, but instead are stepped axially so that the ends of the pin 347 can be located at different axial positions relative to the release member 341. The channel ramps between the steps so that, by rotating the release member 341 about the axis $A_6$, the pin 347 (which can not rotate about the axis $A_6$) can be moved by the operator to any of three axial steps or positions. The walls 397, 398 can be shaped to provide cradles to receive the ends of the pin 347 at one or more of the steps. The ends of the pin 347 can thus act as detents to hold the release member 341 in a fixed axial position relative to the piston 342 at a desired step.

At a first step, as shown in FIG. 5, the pin 347 is located nearest a pawl-engaging surface 354 and the surface 393 that faces the frame 324. When the ends of the pin 347 are at the first step, there is sufficient distance between the pawl-engaging surface 354 and a contact surface 352 on a pawl 350 that no amount of axial movement of the piston 342 will cause the release member 341 to push the pawl 350 to its disengaged position, shown by broken lines in FIG. 5. At a second or intermediate step (not shown), where the ends of the pin 347 are located midway between the surfaces 393, 394, the distance between the contact surface 352 and the pawl-engaging surface 354 is such that axial motion of the piston 342 toward the release member 341 can cause the release member 341 to move sufficiently that the pawl-engaging surface 354 moves from its first location to its second location and pushes the pawl 350 to its disengaged position. At a third step (not shown), where the ends of the pin 347 are located nearest the surface 394, the release member 341 is so close to the frame 324 (so far to the left as viewed in FIG. 5) that the pawl-engaging surface 354 is always at its second location in contact with the contact surface 352 and the pawl 350 is always disengaged. Thus the operator, by rotating the release member 341 about the axis $A_6$, can set the winch for continuous ratchet operation (first step), switchable operation by axial movement of a handle 366 (second step), or free-spool operation (third step).

Figure 6:
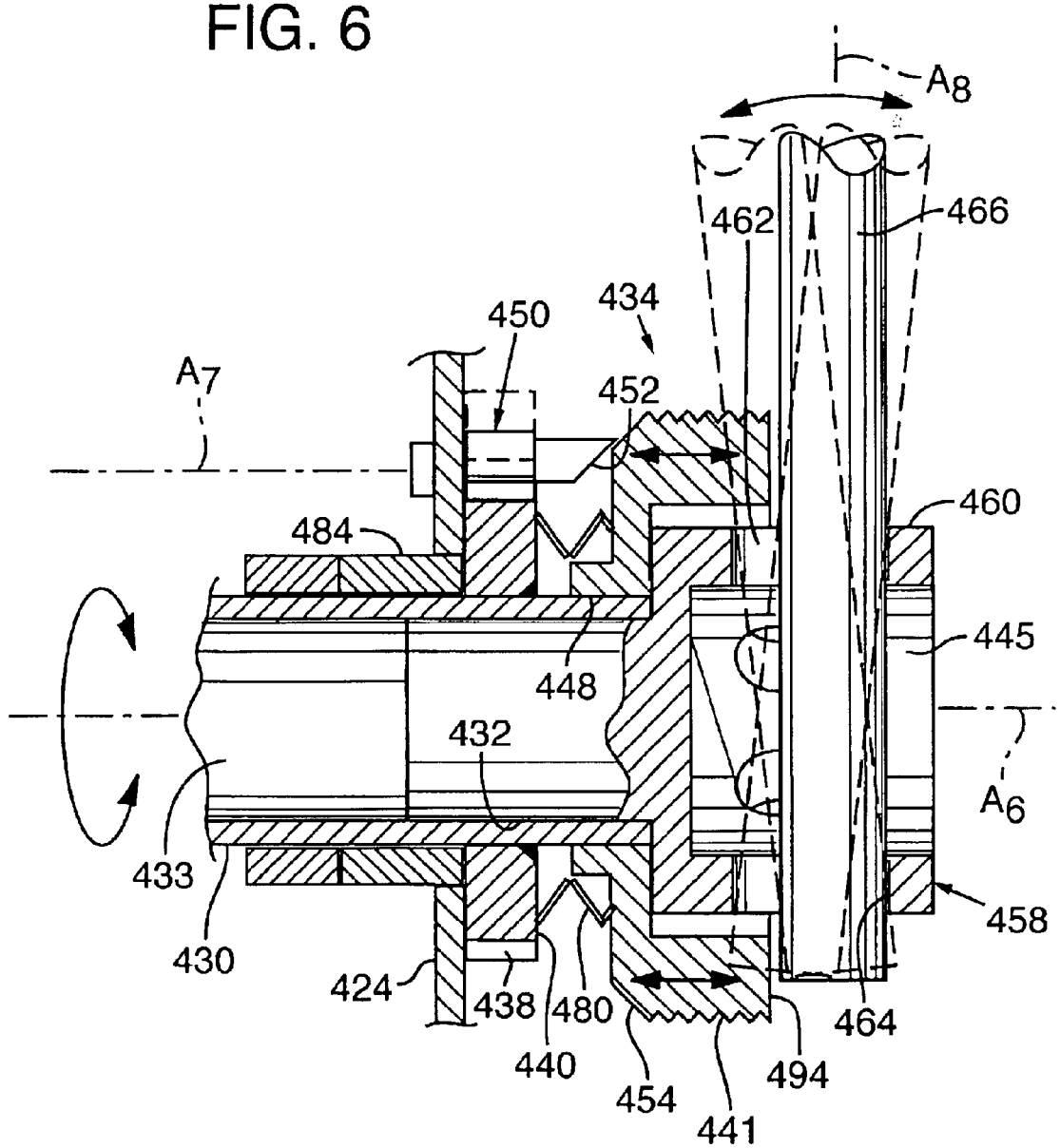
FIG. 6 is a vertical, sectional view of a fifth winch system.

FIG. 6 shows another winch system that is related to the system shown in FIGS. 4A and 4B. Comparable elements in FIG. 6 are indicated by the same reference numerals used in FIGS. 4A and 4B, incremented by two hundred. The winch of FIG. 6 does not include a piston that moves a release member 441. Instead, the release member has an outwardly facing surface 494 that is positioned to engage a handle 466 inserted through openings 462. Engagement of a pawl 450 is controlled by tilting the handle 466 laterally, toward or away from a frame 424, e.g. by pushing a distal portion of the handle 466 (to the left or right as viewed in FIG. 6) such that the handle moves in a plane that includes the axis $A_6$. When the handle 466 is tilted away from perpendicular, so that the longitudinal axis $A_8$ of the handle changes in angle relative to the axis $A_6$, one portion of the handle 466 pushes on the surface 494 of the release member 441 while another portion of the handle 466 pushes on an interior wall 464 that defines one of the openings 462 and serves as a fulcrum. This lever action (first or second class depending on the direction of handle tilt) causes the release member 441 to move axially toward the frame 424 and causes a pawl-engaging surface 454 to move laterally toward the frame 424 until the pawl-engaging surface 454 contacts a contact surface 452. The release member 441 and its pawl-engaging surface 454 are shaped and positioned such that force transmitted from the handle 266 is then transmitted to the contact surface 252. As the release member 441 moves to its second position (not shown), the surface 454 pushes on the surface 452 so that the surface 452 rides up on the surface 454 and the free end of the pawl 450 moves away from the axis $A_6$ to its disengaged position shown by broken lines in FIG. 6. Eventually the pawl-engaging surface 454 travels along the contact surface 452 to a sufficient extent that the pawl 450 is rotated away from ratchet teeth 438 and the ratchet mechanism is disengaged. When the handle 466 is returned to a position where it is perpendicular to the axis $A_6$, a return spring 480 pushes the release member 441 away from the frame 424 and the pawl 450 returns to its engaged position.

Figure 7A:
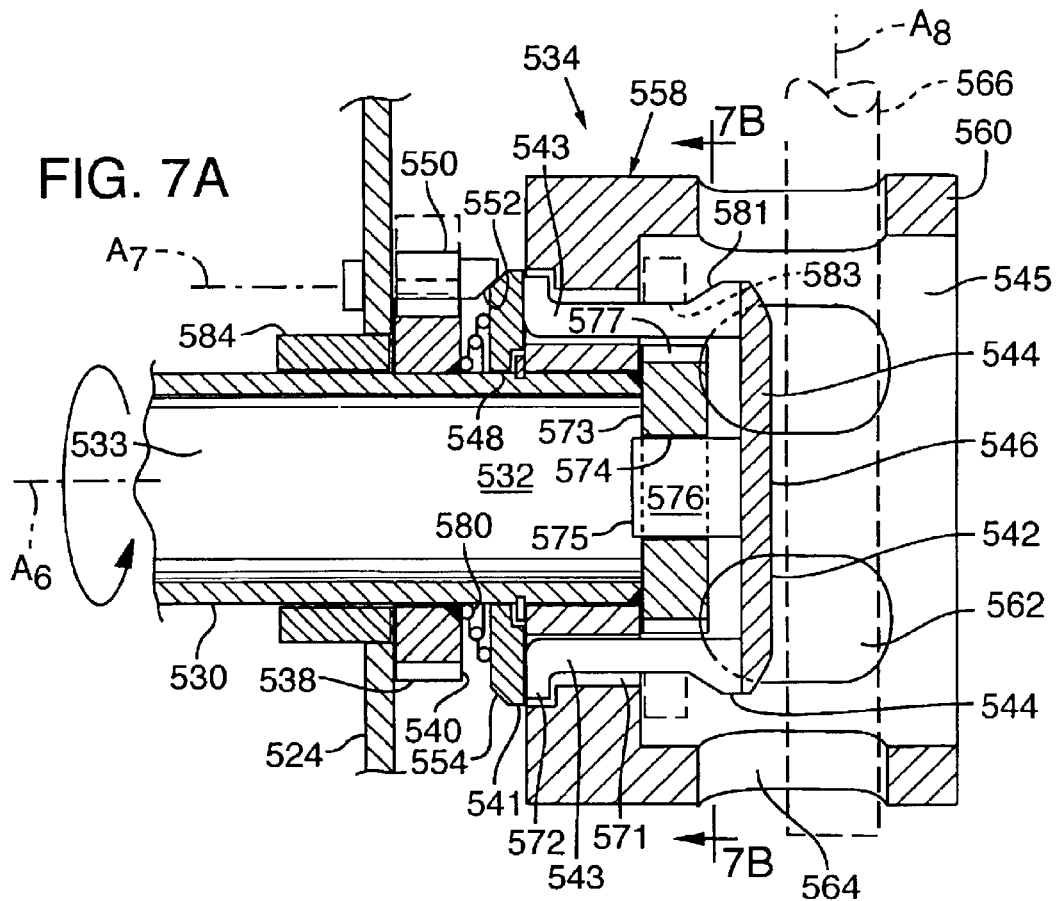
FIG. 7A is a vertical, sectional view of a sixth winch system.
Figure 7B:
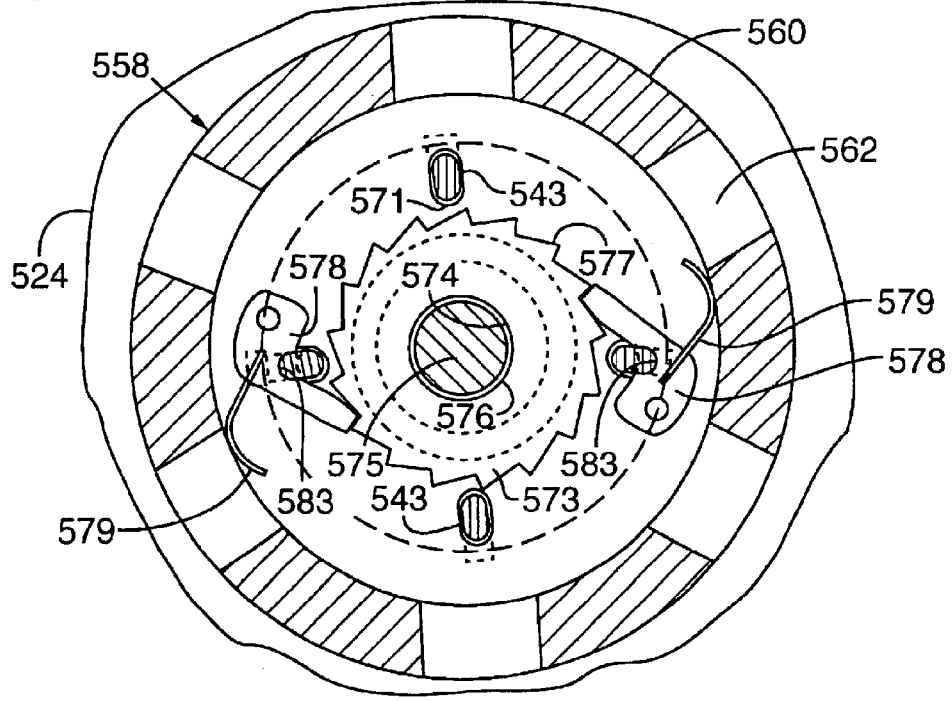
FIG. 7B is a vertical, sectional view taken along line 7B—7B of FIG. 7A.

FIGS. 7A and 7B also show a winch system that bears a resemblance the system shown in FIGS. 4A and 4B. Comparable elements that appear in FIGS. 7A and 7B are indicated by the same reference numerals used in FIGS. 4A and 4B, incremented by three hundred. The system of FIGS. 7A and 7B differs in several respects. Instead of a piston with a body received inside a hollow shaft, the winch of FIGS. 7A and 7B has a piston 542 in the shape of a spider having four legs 543 that extend axially at locations outside a shaft 530 to engage a release member 541. A driver head 558 has a handle-engaging member 560 that defines axial openings 571 through which the legs 543 extend. A foot 572 at the end of each leg 543 extends radially and can contact the handle-engaging member 560 to limit the movement of the piston 542 away from a supporting frame 524.

As in the winch system of FIGS. 4A and 4B, the piston 542 can slide axially relative to the shaft 530. But instead of always rotating with a shaft, the piston 542 can rotate (with the driver head 558) relative to the shaft 530. The driver head 558 is joined to the shaft 530 by a ratchet mechanism. The ratchet mechanism causes the shaft 530 to rotate with the driver head 558 when the driver head is rotated in one direction (counterclockwise as viewed in FIG. 7B), but not to rotate with the driver head when the driver head is rotated in the opposite direction (clockwise as viewed in FIG. 7B). This allows the operator to quickly rotate the shaft 530 simply by rocking a handle 566 back and forth, generally in a plane perpendicular to the axis $A_6$, instead of having to rotate the handle continuously or to remove and replace the handle repeatedly.

To achieve such ratcheting operation, the winch system of FIGS. 7A and 7B has an endplate 573 that is welded on the free end of the shaft 530. The endplate 573 has an axially extending cavity defined by an interior surface 574 that is a cylinder of circular cross section. A stub shaft 575, that is a portion of the piston 542, extends into the cavity through the endplate 573. The shaft 575 has a peripheral surface 576 that is cylindrical, is circular in cross section, and has a slightly smaller cross-sectional diameter than that of the cavity. The surface 574 and surface 576 are sized so that the piston 542 can slide axially relative to the endplate 573, and such that the piston 542 can rotate relative to the shaft 530 about the axis $A_6$. In the illustrated embodiment, the endplate 573 has an outside diameter greater than the shaft 530 and serves as a stop to prevent the driver head 558 from sliding off of the shaft 530 and as a ratchet wheel that is coaxial with the shaft.

The endplate 573 provides a second series of ratchet teeth 577 that are spaced around the axis $A_6$. Because the endplate 573 is secured to the shaft 530, the teeth 577 rotate about the axis $A_6$ as the shaft rotates. One or more secondary pawls 578, two of which are shown in the embodiment of FIGS. 7A and 7B, are mounted on the driver head 558 and positioned such that the pawls 578 engage the ratchet teeth 577. Return springs 579 are positioned to urge the second pawls 578 toward the ratchet teeth 577.

It can be seen that the driver head 558 is mounted to rotate relative to the second series of teeth 577. Normally, the second pawls 578 allow the driver head 558 to rotate in only one direction (clockwise as shown by a curved arrow in FIG. 7B) relative to the shaft 530. When the driver head 558 is urged to rotate in that one direction, the shaft 530 does not follow because it is prevented by the pawl 550 which normally allows the shaft 530 to rotate in only one direction (counterclockwise as viewed in FIG. 7B) relative to the frame 524. In other words, when the driver head 558 is urged to rotate in the direction opposite the one direction in which the shaft 530 normally can rotate, the driver head can rotate relative to the shaft. The second pawls 578 normally prevent the driver head 558 from rotating relative to the shaft 530 when the driver head 558 is urged to rotate in the direction (counterclockwise as viewed in FIG. 7B) that the shaft 530 can rotate relative to the frame 524. Thus, as viewed in FIG. 7B, an operator can use a handle 566 to rotate the driver head 558 counterclockwise and thereby rotate the shaft 530 in the same direction. Or, the operator can use the handle to rotate the driver head 558 clockwise, to reposition the handle 566, without rotating the shaft 530.

As in other embodiments, the handle 566 can be tilted toward or away from the frame 524 to control pawl engagement status. Normally, the pawls 550, 578 are located in their engaged positions as shown in FIGS. 7A and 7B. An operator can release all the pawls, so that the shaft 530 is free to rotate in either direction, by tilting the handle 566 toward or away from the frame.

Initially, when the handle 566 is inserted, it extends substantially perpendicularly to the axis $A_6$. When the handle 566 is tilted away from perpendicular, so that the longitudinal axis $A_8$ of the handle changes in angle relative to the axis $A_6$, one portion of the handle 566 pushes on the head 544 of the piston 542 while another portion of the handle 566 pushes on an interior wall 564 that defines one of the openings 562. This lever action (first or second class depending on the direction of handle tilt) causes the piston 542 to move axially toward the frame 524. The feet 572 of the piston press against the release member 541, which responds by moving towards the frame 524. As the release member 541 moves (to the left as viewed in FIG. 7A), an annular pawl-engaging surface 554 moves laterally toward the frame 524 until the pawl-engaging surface 554 contacts a contact surface 552 on the pawl 550. The release member 541 and its pawl-engaging surface 554 are shaped and positioned such that force transmitted from the handle 566 is thus transmitted to the contact surface 552. As the release. member 541 moves to its second position (not shown), the surface 554 pushes on the surface 552 so that the surface 552 rides up on the surface 554 and the free end of the pawl 550 moves away from the axis $A_6$ and the ratchet teeth 538. Eventually the pawl-engaging surface 554 travels along the contact surface 552 to a sufficient extent that the pawl 550 reaches its disengaged position, shown by broken lines in FIG. 7A, and the ratchet mechanism is disengaged.

Movement of the piston 542 also causes the second pawls 578 to be released from engagement with the ratchet teeth 577. As the piston moves (to the left as viewed in FIG. 7A), ramped pawl-engaging surfaces 581 move laterally toward the frame 524 until the pawl-engaging surfaces 581 contact a contact surface 583 on each pawl 578. The pawl-engaging surfaces 581 are shaped and positioned such that lateral force applied to the handle 566 is transmitted to the contact surfaces 583. As the piston 542 moves to its second position (not shown), the surfaces 581 push on surfaces 583 so that the surfaces 583 ride up on the surfaces 554 and the free ends of the pawls 578 move away from the axis $A_6$ and the ratchet teeth 577. Eventually the pawl-engaging surfaces 581 travel along the contact surfaces 583 to a sufficient extent that the pawls 578 reach their disengaged positions (not shown), and the secondary ratchet mechanism is disengaged.

When the handle 566 is returned to its initial position, substantially perpendicular to the axis $A_6$, the return spring 580 urges the illustrated elements of the driver head 558 to return to their original positions shown in FIGS. 7A and 7B.

Figure 8A:
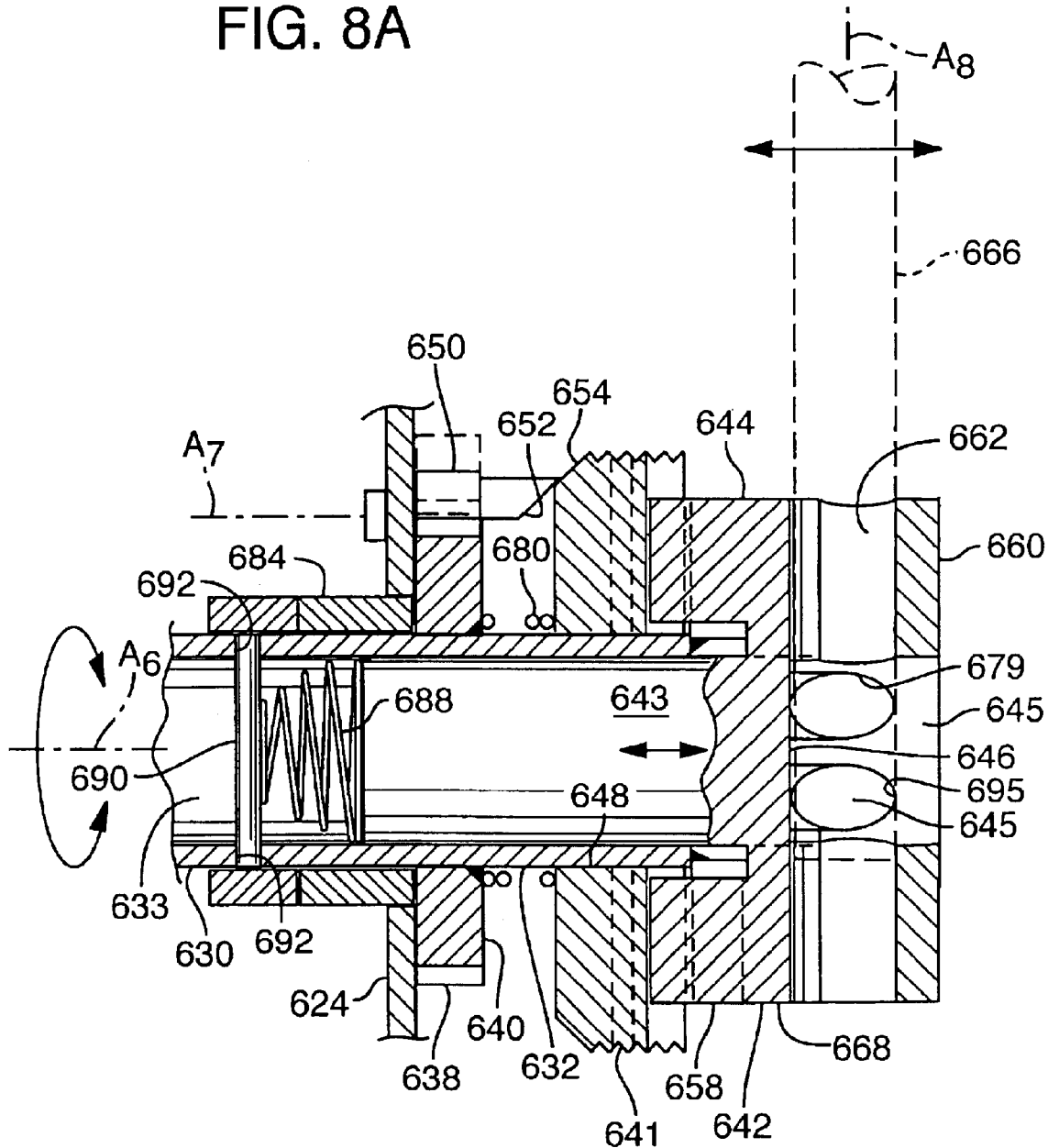
FIG. 8A is a vertical, sectional view of a seventh winch system.

FIGS. 8A–8C show another winch system. Comparable elements that appear in FIGS. 8A–8C are indicated by the same reference numerals used in FIGS. 4A and 4B, incremented by four hundred. There are variations in this embodiment from those previously described. As in some of the other embodiments, a driver head 658 is provided to drive a shaft 630.

The system of FIGS. 8A–8C has a unique arrangement for disengaging a pawl by lateral movement of a handle by an operator. The driver head 658 has a uniquely shaped piston 642 that is connected to a shaft 630 in such a way that the shaft rotates with the piston, but the piston can move axially relative to the shaft. The piston has a body portion 643 and a head portion 644 that includes plural radially extending arms or pedals 668. The arms 668 have surfaces 669, 670 positioned to mate with and engage grooves or valleys 697, 698, 699 on a stepped surface 696 of a uniquely shaped release member 641. The grooves are shaped to provide cradles to receive and hold the arms 668, with the surfaces of the grooves being angled to abut the surfaces 669, 670 of the arms 668.

In the illustrated embodiment, best seen in FIG. 8C, each piston arm 668 has several types of radially extending surfaces. Two generally planar release member-engaging surfaces 669, 670 face the release member 641, are angled relative to each other, and meet at a radially extending ridge 671. Two generally planar spaced-apart side surfaces 672, 673 extend axially and lie in planes that extend parallel to the axis $A_6$. A concave, generally hemicylindrical surface 674 faces away from the release member 641 and has an axis that extends radially, perpendicular to the axis $A_6$.

A handle-engaging portion 660 of the driver head 658 is welded to an end of the shaft 630. The handle-engaging portion 660 defines a cylindrical bore 645 that is coaxial to the axis $A_6$ and that contains at least portions of the piston's body 643 and head 644. The handle-engaging portion 660 also defines a plurality of grooves 677 that receive the arms 668. Each groove 677 is defined by a generally U-shaped wall 679 that has a concave base wall portion 695 and two facing side wall portions 693, 694. One arm 668 is received in each groove 677, with the surfaces of the facing side wall portions 693, 694 extending axially in parallel to surfaces 672, 673 respectively. The grooves 677 are sufficiently deep (as measured parallel to the axis $A_6$) that the arms 668 can move axially through the grooves. For each groove 677, a concave surface 674 of the piston and a concave surface portion 695 of the wall 679 together define a radial opening 662 that is sized and shaped to receive a handle 666 inserted by an operator through a pair of openings 662 on opposite sides of the axis $A_6$.

When a handle 666 is received between an arm 668 and the facing base wall portion 695 of the groove 667 which contains the arm, the handle 666 can be tilted toward or away from the frame 624 to vary the angle of the handle relative to the axis $A_6$. When so laterally tilted, the handle 666 serves as a lever (first or second class depending on the direction of handle tilt) with a base wall portion 695 serving as a fulcrum. Tilting causes the handle 666 to push on the piston 642 and move the piston axially, which in turn causes the release member 641 to move axially if the arms 668 are aligned with an appropriate set of grooves defined in the annular surface 696 of the release member 641.

In the illustrated embodiment there are three sets of radial grooves defined in the annular surface 696. (Fewer or more sets of grooves could be used, but three sets is optimum as discussed below.) A first set consists of the grooves 697. A second set consists of the grooves 698. And, a third set consists of the grooves 699. The grooves of each set are of a common depth (as measured parallel to the axis $A_6$). Each set has grooves that differ in depth from the grooves of the other two sets. The grooves 697 are sufficiently deep that, when the arms 668 are received in the grooves 697 of the first set, no amount of axial movement of the piston 642 will cause the release member 641 to push a pawl 650 to its disengaged position (shown by broken lines in FIG. 8A). The grooves 698 of the second set are of such a depth that, when the arms 668 are received in the grooves 698, axial motion of the arms 668 toward the frame 624 can cause the release member to move sufficiently that the pawl-engaging surface 654 moves between its illustrated first location to its second location (not shown) nearer the frame. The grooves 699 of the third set are sufficiently shallow that, when the arms 668 engage the grooves 669, the release member 641 is continuously maintained at a position where the pawl-engaging surface 654 is at its second location near the frame 624 and the pawl is continuously disengaged. The grooves of each set are uniformly spaced around the axis $A_6$ and the sets are arranged around the surface 696 to provide a repeating series of grooves of various depths, such that the uniformly spaced arms 668 of the piston 642 can be received by the grooves of only one set at a time.

The release member 641 is rotatable about the axis $A_6$ and with respect to the piston 642 so that a user of the winch can rotate the release member relative to the arms 668 to align the arms with the grooves of a desired set. The surfaces which define the grooves 697, 698, 699 are angled to serve as ramps to facilitate rotation of the release member 641 by the operator in relation to the piston arms 668. The operator can thus easily rotate the release member 641 about the axis $A_6$ to set the winch for continuous ratchet operation (first set of grooves 697), switchable operation by axial movement of a handle 666 (second set of grooves 698), or free-spool operation (third set of grooves 699).

A spring 680 urges the release member 641 toward the arms 668 so that, once the user aligns the arms with a desired set of grooves, the spring holds the release member in the desired alignment. In effect, the arms 668 act as detents that prevent the spring-loaded release member 641 from rotating relative to the piston 642, except when an operator overcomes the force applied by the spring 680.

FIGS. 9A–9D show a winch system that in many aspects is similar to the system shown in FIGS. 2A–2D. Comparable elements in FIGS. 9A–9D are indicated by the same reference numerals used in FIGS. 2A–2D, incremented by seven hundred. The device of FIGS. 9A–9D advantageously includes a mechanism 710 to hold a body 736 in a position wherein the pawl 750 is disengaged from the teeth 738. This is accomplished by an arrangement whereby the body 736 disengages the pawl 750 when the body is moved axially, outwardly from a supporting frame 724 along the axis $A_1$. Also advantageous is the mounting of the holding mechanism 710 and the pawl 750 on a plate 751. that easily can be retrofitted onto an existing frame 724 and attached by welding or by fasteners (not shown). Plates of the type illustrated in FIGS. 9A–9D could be used with other of the embodiments described herein to simplify mounting.

Figure 9A:
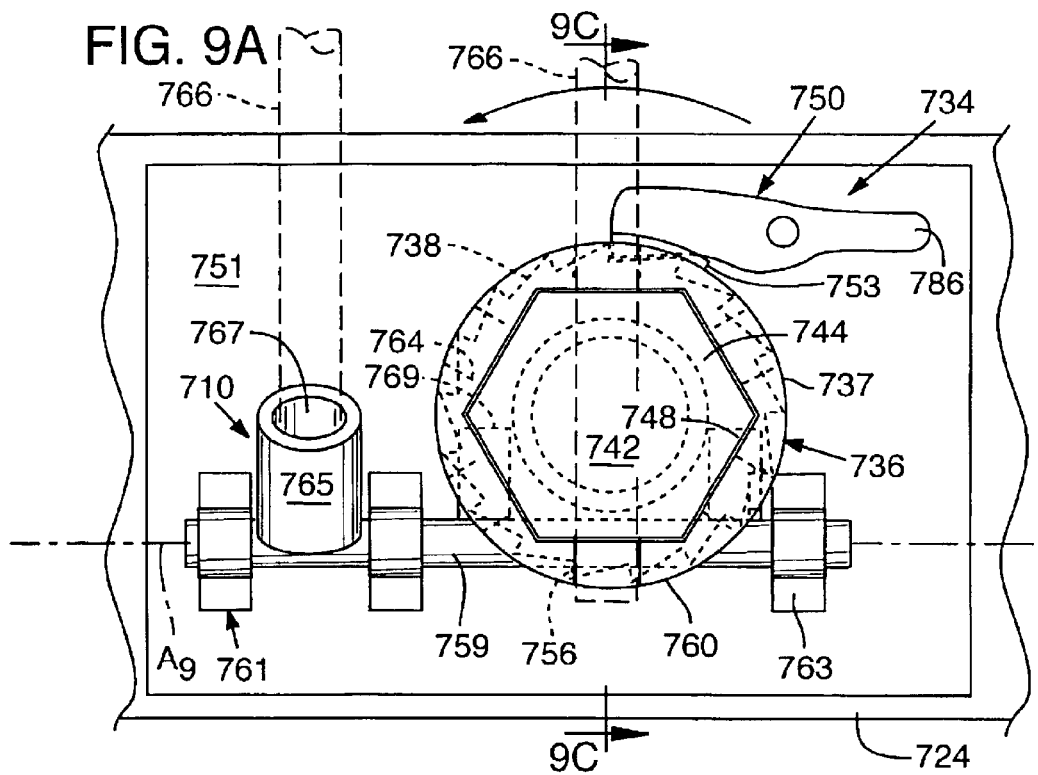
FIG. 9A is a vertical, plan view of an eighth winch system.
Figure 9B:
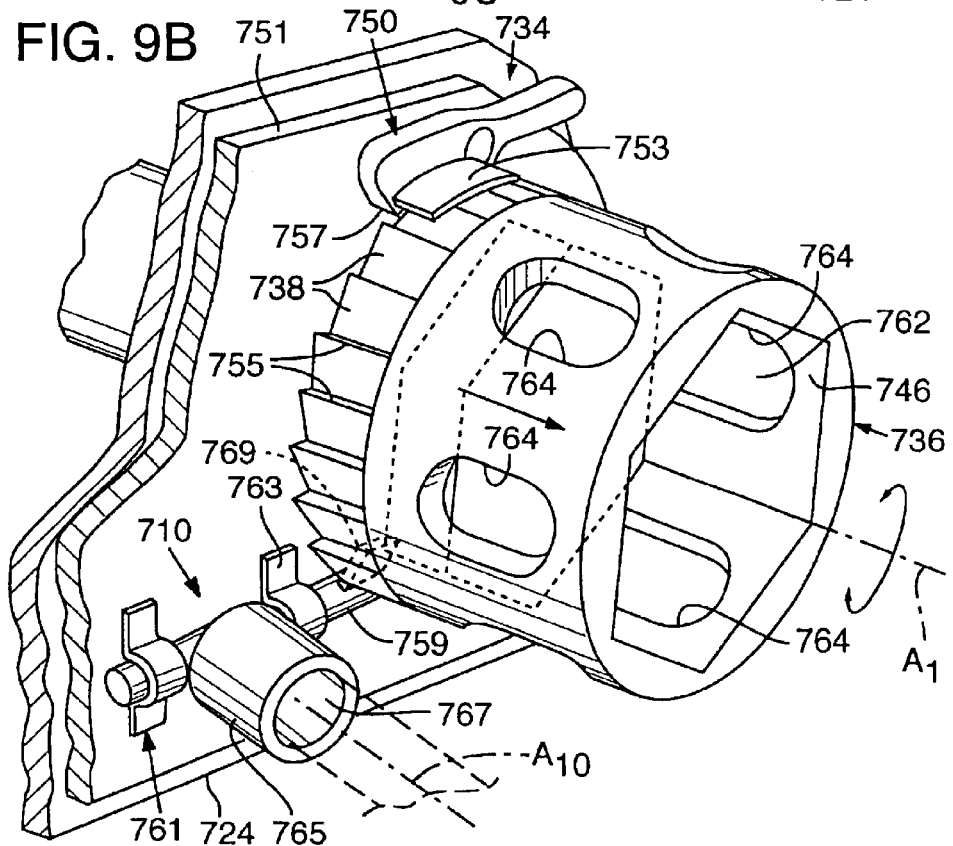
FIG. 9B is an oblique view of the winch system shown in FIG. 9A.

In particular, FIGS. 9A–9D show a drive system 734 that is a unitary body 736 having a generally cylindrical exterior surface 737 that is coaxial with an axis $A_1$. The surface 737 defines a ring or series of ratchet teeth 738 evenly spaced around the axis $A_1$. The body 736 is mounted so that it can slide axially relative to the shaft 730 but can not rotate relative to the shaft 730 such that, when the body 736 is rotated about the axis $A_1$, the shaft 730 also rotates as indicated by the curved arrow in FIG. 9B. This is accomplished by providing a head or button 742 welded to an end of the shaft 730. The head 742 has a peripheral surface 744 that is cylindrical, is hexagonal in cross section, as shown in FIGS. 9A and 9B, and is at least partially received inside an axially extending cavity 746 defined inside the body 736 by an interior surface 748. The surface 748 is a cylinder having a hexagonal cross section of slightly larger dimensions than those of the surface 744. The hexagonal surface 744 and hexagonal surface 748 are sized and shaped to mate with each other so that the head 742 can move axially relative to the body 736, and such that the shaft 730 must rotate with the head 736 when the head 742 is inside the cavity 746. It will be appreciated that the cross-sections of the cylindrical surfaces 744, 748 need not be hexagonal in shape, but could be any other pair of mating cylindrical shapes, such as pentagons or more complex shapes (not shown), that allow the body of 736 normally to move axially, but not rotate independently of the shaft 730.

A pawl 750 is rotationally mounted on the plate 751 so that the pawl can rotate about an axis $A_2$ between two positions. In FIGS. 9A and 9C, the pawl 750 is shown in an engaged position wherein the pawl engages the series of ratchet teeth 738 such that the shaft 730 can rotate only in one direction. A release handle 786 provided on the pawl 750 can be used to rotate the pawl 750 about the axis $A_2$ to a disengaged position (not shown) wherein the pawl does not engage the series of ratchet teeth 738. When the pawl 750 is in the disengaged position, the shaft 730 can rotate in both directions.

Extending from the pawl 750 is a support or contact member that, in the embodiment of FIGS. 9A–9D, is a flange 753 on the side of the pawl opposite the frame 724. The flange 753 is located so as to ride on radially outermost edges 755 of the ratchet teeth 738 while a tooth engaging edge 757 of the pawl 750 extends sufficiently toward the axis $A_1$ to be received between two of the teeth 738. As can be seen by comparing FIG. 2C to FIG. 9D, the body 736 is mounted to move axially so that body and its ring of teeth 738 can be moved axially relative to the shaft 730 between a first location shown in FIG. 9C and a second location shown in FIG. 9D.

When the body 736 is in the first location, the engaging edge 757 of the pawl 750 is located between two of the teeth 738 and engages at least one of the teeth. When the body 736 is moved to the second location shown in FIG. 9D, the ring of teeth 738 is located so far from the frame 724, that the engaging edge 757 of the pawl 750 does not engage any of the teeth 738. Thus movement of the body 736 between its first and second locations causes the ring of teeth 738 to engage and disengage the engaging edge 757. The flange 753 extends axially a sufficient distance that the flange at all times remains in contact with the body 736 and thus prevents the pawl 750 from falling into a gap that is present between the body 736 and the plate 751 when the body 736 is moved to the second location as shown in FIG. 9D.

The drive system 734 also has a handle-engaging portion 760. The illustrated handle-engaging portion 760 includes a series of radial openings 762 that are defined by interior surfaces 764 and are sized and shaped to receive a rod-like handle 766 that may be inserted by an operator through a pair of opposed openings 762. Each opening 762 has a length L measured parallel to the axis $A_1$ and a width W measured perpendicular to a plane (not shown) that bisects the opening and includes the axis $A_1$. The length L is greater than the width W. Ideally, the length L is considerably larger than the diameter of the handle 766, whereas the width W is only slightly larger than the diameter of the handle 766.

Thus, when a handle 766 is inserted into openings 762, the handle can move axially through the openings parallel to the axis $A_1$ to a limited extent, and can not rotate to any great extent relative to the body 736 about the axis $A_1$.

When a handle is inserted into the body 736, the operator can use the handle to apply rotational force in the directions shown by the two-headed arrow in FIG. 9B. The force is transmitted from the handle to the shaft 730 via the body 736. Thus, by applying a torquing force to the handle 766, the operator will urge the shaft 730 to rotate.

The handle 766 can also be used as a lever (first or second class depending on the direction of tilt) to transmit axially directed force that causes the body 736 to move from its first location to its second location. When the handle 766 is tilted toward or away from the frame 724 so that the longitudinal axis $A_3$ of the handle changes in angle relative to the axis $A_1$, a portion of the handle 766 pushes on the head 742 while another portion of the handle 766 pushes on an interior surface 764 that defines one of the radial openings 762. Thus, in the embodiment of FIGS. 9A–9D, tilting the handle 766 toward or away from the frame 724 pulls the body 736 outwardly away from the frame and causes the ring of teeth 738 to move laterally relative to the frame 724 from its first location to its second location. (The head 742 serves as a fulcrum when an end of the handle 766 is pulled away from the frame 724 as shown in FIG. 9D. Thus, when the handle 766 is moved in that way, it acts as a second class lever.)

When the handle 766 is moved laterally to the position shown in FIG. 9D, the ring of teeth 738 is pulled away from the pawl 750 so that the pawl no longer engages any of the teeth 738. When the pawl 750 is thus disengaged, the operator can rotate the body 736 in either direction about the axis $A_1$. In turn, the shaft 730 rotates about the axis $A_1$ in the direction that the handle 766 is rotated. It thus can be seen that the operator can both disengage the pawl 750 and cause the shaft 730 to rotate while maintaining both hands firmly gripped on the handle 766.

A return spring 780 is provided between the body 736 and head 742 to urge the body and its ring of teeth 738 to return to the first location. This is helpful to assure that the pawl 750 will normally engage the ring of teeth to prevent inadvertent free-spooling of the shaft 730. When an operator releases the handle 766, the spring 780 moves the body 736 moves back toward the frame 724 and the engaging edge 757 is again received between two of the teeth 738. A stop plate 782 is welded to the shaft 730 to prevent the shaft 730 from shifting axially relative to the frame 724. Another device could be used, instead of the plate 782, to limit axial movement of the shaft 730.

The system of FIGS. 9A–9D includes a quick release device to be used when an operator wants the shaft 730 to rotate freely, such as when the operator wants to unwind a chain, strap, or other extensible member that is wrapped around the shaft 730. The illustrated quick release device has a shaft 759 that is mounted on the plate 751 in such a manner that the shaft can be rotated about an axis $A_9$. In the embodiment of FIGS. 9A–9D, the shaft 759 is rotationally secured in bearings 761 that, in the illustrated embodiment, are pivot brackets made from metal straps 763 that are welded to the plate 751 and that have arch-shaped center portions that receive the shaft. Mounted on the shaft 759 is a socket 765 having a central cavity 767 that is generally cylindrical and shaped to receive the end of a handle 766 and that extends generally radially from the shaft 759. The socket 765 has an axis $A_{10}$ that is coaxial with a handle 766 received in the cavity 767 of the socket 765. Also extending generally radially from the shaft 759 is a protrusion such as an engagement pin or, as illustrated, an ear 769. One portion of the shaft 759 is located between the body 736 and the plate 751, with at least a part of the ear 769 being located on that portion of the shaft. The socket 765 is connected to a portion of the shaft 759 that is not located between the body 736 and the plate 751.

During normal operation, the shaft 759 is at rest in a position where the ear 769 either does not contact the body 736 or lightly rests on the body 736 due to gravity without applying a significant amount of force on the body. For example, the shaft 759 can be in the position shown in FIG. 9C wherein the ear 769 extends generally parallel to the plate 751. If the operator is not concerned about restricting rotation of the shaft 730 and wants to maintain the shaft 730 in a free-spool condition, the operator can use the quick release mechanism 710. The operator inserts a handle 766 into the socket 765 and uses the handle as a lever to rotate the shaft 759 (clockwise as viewed in FIGS. 9C, 9D). As the shaft is rotated, the ear 769 engages a surface of the body 736 and pushes the body 736 away from the plate 751. The ear 769 thus acts as a cam and the body 736 acts as a cam follower.

Sufficient rotation of the shaft 759 will cause the ear to shift the body sufficiently that, as shown in FIG. 9D, the ratchet teeth 738 are disengaged from the pawl 750. When the body 736 is so shifted, the shaft 730 and body 736 are free to rotate. When the ear 769 is centered, extending normal to the plate 751 as shown in FIG. 9D, the operator can remove the handle 766 from the socket 765. The shaft 730 remains in the free-spool condition because horizontally extending the ear 769 prevents the return spring 780 from operating to move the body back toward the plate 751. For even greater stability, the shaft 759 can be rotated to a position where the ear 769 is propped in a somewhat over-centered (not shown). For example, in the illustrated embodiment, the shaft 759 could be rotated to the extent that the distal end 771 of the ear 769 is at an elevation below the elevation of the axis Ag of the shaft 759. The angle between the socket axis $A_{10}$ and the plane of the ear 769 when viewed along the axis of the shaft 759 as in FIGS. 9C, 9D, can be selected to establish a specific centered or over-centered location for the ear 769. The plane of the ear 769 is the plane that includes the axis $A_9$ of the shaft 759 and the distal end 771 of the ear 769, the "distal end" being the part of the ear which contacts the body 736. For example, the angle between the socket axis $A_{10}$ and the ear plane can be selected so that, when the shaft 759 is rotated sufficiently that the socket 765 abuts the plate 751 at a location below the shaft, the ear 769 extends toward the body 736 at a desired angle relative to horizontal.

When the operator wishes to again engage the ratchet mechanism, the operator can move the socket 765 back up to the at-rest position shown in FIG. 9A. As the socket is moved back to that position, the return spring 780 moves the body 736 toward the plate 751 and the ring of teeth 738 again engages the pawl 750.

In FIGS. 10A to 10D a winch system 820 is shown mounted to a frame 824 of a cargo carrying vehicle, in particular an automobile transport trailer. The cargo, for example automobiles, is secured to the transport vehicle by an elongated member (not shown). One end of the elongated member is secured to a winch spool shaft 830 between two disks 859 that serve as the side walls of a spool. The other end of the elongated member is free so that the elongated member can be secured to the cargo, for example an automobile. Or the elongated member can extend over or around the cargo as previously described. Used in this second way, a winch can secure a cargo container or lumber, for example, to a railroad car, truck bed, or deck of a ship (not shown).

The shaft 830 is rotationally mounted relative to the frame 824. The shaft 830 can rotate about an axis $A_{11}$ of rotation to wrap the elongated member around the shaft 830 between the two disks. The winch system 820 has a drive system 834 secured to the shaft 830 to control the rotation of the shaft.

The drive system 834 has a body 836 having a generally cylindrical exterior surface 837 that is coaxial with the axis $A_{11}$. The surface 837 defines a ring or series of ratchet teeth 838 spaced around the axis $A_{11}$ at an even distance from the axis. The body 836 is mounted on the shaft 830 so that it cannot slide axially relative to the shaft 830 and cannot rotate relative to the shaft 30 such that, when the body 836 is rotated about the axis $A_1$, the shaft 830 also rotates. This conveniently is accomplished by welding the body 836 to an end of the shaft 830.

A pawl 850 is rotationally mounted on the frame 824 so that it can rotate about an axis $A_{12}$ between two positions. The pawl 850 is shown in an engaged position wherein the pawl engages the series of ratchet teeth 838 such that the shaft 830 can rotate only in one direction. A release handle 886 provided on the pawl 850 can be used to rotate the pawl about the axis $A_{12}$ to a disengaged position (not shown) wherein the pawl does not engage the series of ratchet teeth 838. When the pawl 850 is in the disengaged position, the shaft 830 can rotate in both directions. The pawl is similar to and operates much like the pawl 750 shown in FIGS. 9A–9D and described above. As can be seen by comparing FIG. 10B to FIG. 10C, the body 836 is mounted to move axially, along with the shaft 830, so that body and its ring of teeth 838 can be moved axially between a first location shown in FIG. 10B and a second location shown in FIG. 10C.

When the body 836 is in the first location, the engaging edge of the pawl 850 is located between two of the teeth 838 and engages at least one of the teeth. When the body 836 is moved to the second location shown in FIG. 10C, the ring of teeth 838 is located so far from the frame 824, that the engaging edge of the pawl 850 does not engage any of the teeth 838. Thus movement of the body 836 between its first and second locations causes the ring of teeth 838 to engage and disengage the engaging edge of the pawl. The engaging edge of the pawl 850 and/or the teeth 838 may be ramped to assist in the reengagement of the pawl and the teeth. Or a flange may be provided to support the pawl 850 as in the system shown in FIG. 9D.

The drive system 834 also has a handle-engaging portion 860. The illustrated handle-engaging portion 860 includes a series of radial openings 862 that are sized and shaped to receive a rod-like handle 866 that may be inserted by an operator through a pair of opposed openings 862. Each illustrated opening 862 has a length measured parallel to the axis $A_{11}$ and a width measured perpendicular to a plane (not shown) that bisects the opening and includes the axis $A_{11}$. The length is greater than the width. In the system shown in FIGS. 10A–10D, the length is considerably larger than the diameter of the handle 866, whereas the width is only slightly larger than the diameter of the handle 866. Thus, when a handle 866 is inserted into openings 862, the handle can move axially through the openings parallel to the axis $A_{11}$ to a limited extent, and can not rotate to any great extent relative to the body 836 about the axis $A_{11}$.

Figure 10A:
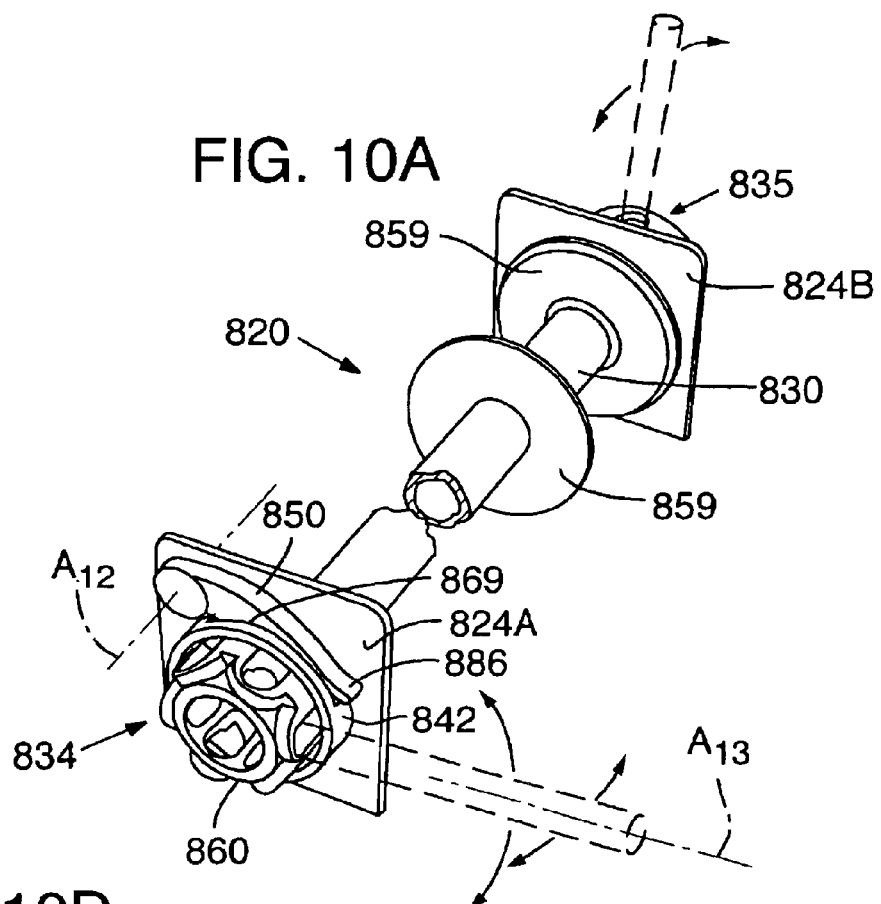
FIG. 10A is an oblique view of a tenth winch system.
Figure 10D:
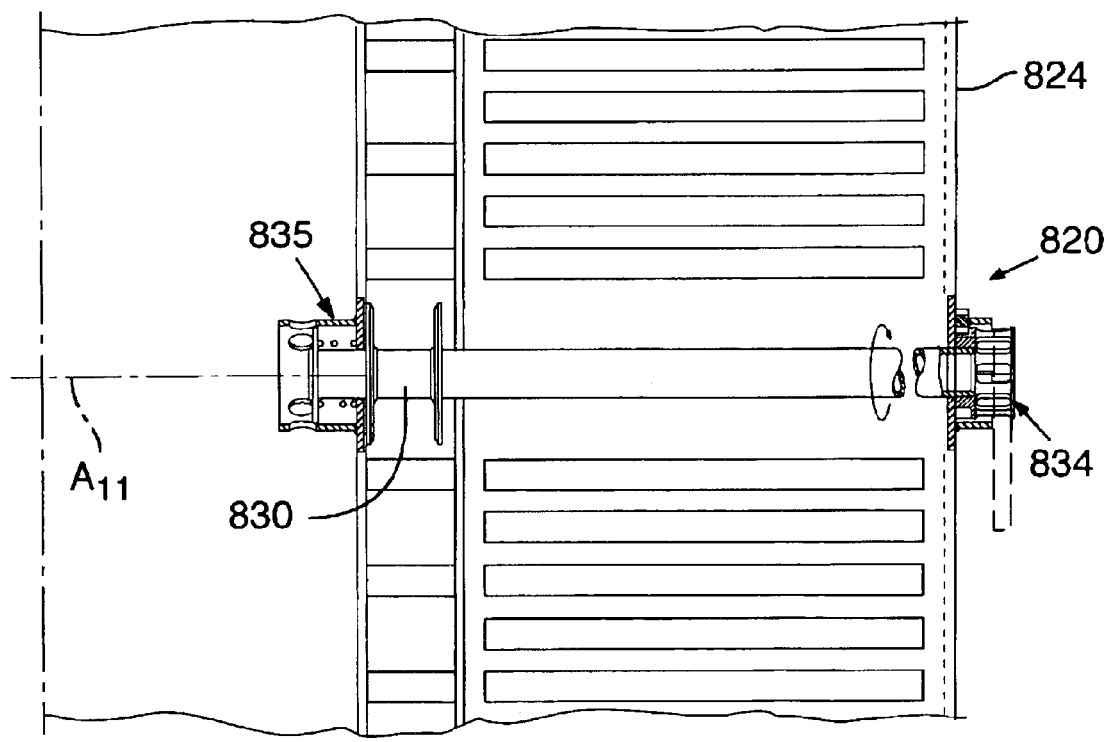
FIG. 10D is a bottom plan view of the tenth winch system installed below the deck of an automobile carrier vehicle, with portions in section to show internal structure.

When a handle is inserted into the body 836, the operator can use the handle to apply rotational force in the directions shown by the vertically extending two-headed arrow in FIG. 10A. The force is transmitted from the handle to the shaft 830 via the body 836. Thus, by applying a torquing force to the handle 866, the operator will urge the shaft 830 to rotate.

The handle 866 can also be used as a lever (first or second class depending on the direction of tilt) to transmit axially directed force that causes the body 836 to move from its first location to its second location. When the handle 866 is tilted toward or away from the frame 824, shown by the horizontally extending two-headed arrow in FIG. 10A, so that the longitudinal axis $A_{13}$ of the handle changes in angle relative to the axis $A_{11}$, a portion of the handle 866 pushes on a ring 842 that extends around the body 836 and is secured to the frame 824 while another portion of the handle 866 pushes on an interior surface 864 that defines one of the radial openings 862. The illustrated ring 842 is generally cylindrical and is positioned coaxially with respect to the body 836, although other shapes and positions are possible. The ring defines a radially extending opening 869 through which a portion of the pawl, including the tooth-engaging edge, extends to engage the teeth 838. Thus, in the embodiment of FIGS. 10A–10D, tilting the handle 866 toward or away from the frame 824 pulls the body 836 outwardly away from the frame and causes the ring of teeth 838 to move laterally relative to the frame 824 from its first location to its second location. (The ring 842 serves as a fulcrum when an end of the handle 866 is pulled away from the frame 824 as shown in FIG. 10C. Thus, when the handle 866 is moved in that way, it acts as a second class lever.)

When the handle 866 is moved laterally to the position shown in FIG. 10C, the ring of teeth 838 is pulled away from the pawl 850 so that the pawl no longer engages any of the teeth 838. When the pawl 850 is thus disengaged, the operator can rotate the body 836 in either. direction about the axis $A_{11}$. In turn, the shaft 830 rotates about the axis $A_{11}$ in the direction that the handle 866 is rotated. It thus can be seen that the operator can both disengage the pawl 850 and cause the shaft 830 to rotate while maintaining both hands firmly gripped on the handle 866.

A return spring 880 is provided to urge the shaft 830, body 836 and ring of teeth 838 to return to the first location. This is helpful to assure that the pawl 850 will normally engage the ring of teeth to prevent inadvertent free-spooling of the shaft 830. When an operator releases the handle 866, the spring 880 moves the body 836 back toward the frame 824 and the engaging edge of the pawl 850 is again received between two of the teeth 838.

The system of FIGS. 10A–10D includes a quick release system 835 conveniently located near the center of a vehicle at the opposite end of the shaft 830 from the drive system 834. The quick release system can be used when an operator wants the shaft 830 to rotate freely, such as when the operator wants to unwind a chain, strap, or other extensible member that is wrapped around the shaft 830.

The illustrated quick release system 835 includes a head or button 871 welded or otherwise secured to an end of the shaft 830. The system 835 also has a handle-engaging portion 885 that extends around the head 871 and is secured to the inner frame portion 824B, for example by a weld. The illustrated handle-engaging portion 885 is generally cylindrical and includes a series of radial openings 887 that are defined by interior surfaces 889, are sized and shaped to receive the rod-like handle 866 that may be inserted by an operator through a pair of opposed openings 887, and are located outwardly of the head 871 relative to the inner frame portion 824B.

Figure 10B:
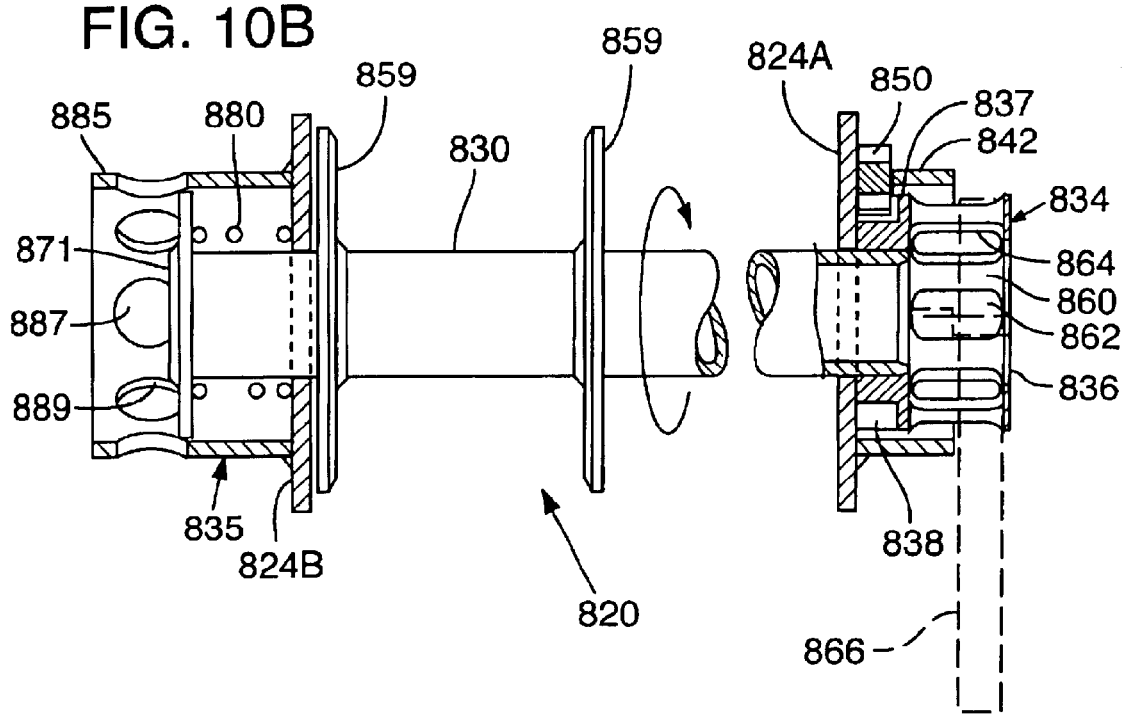
FIG. 10B is a bottom plan view of the tenth winch system with a central shaft assembly in a first position, with portions in section to show internal structure.
Figure 10C:
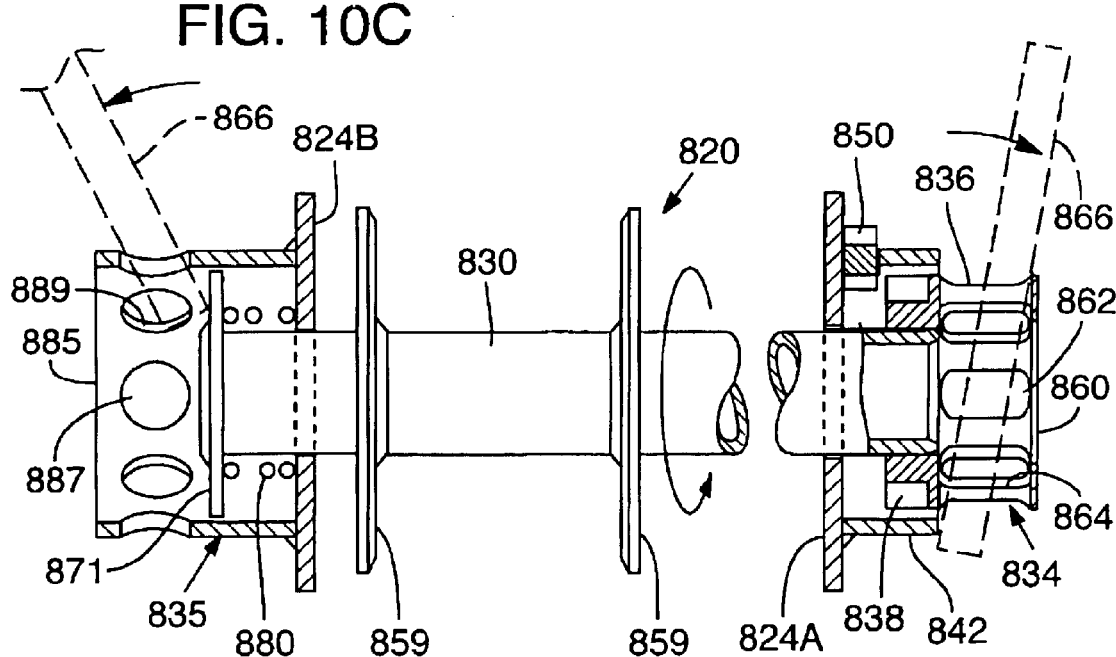
FIG. 10C is a bottom plan view of the tenth winch system with a central shaft assembly in a second position, with portions in section to show internal structure.

The handle 866 is useful to transmit axially directed force that causes the shaft 830 and the body 836 to move axially so that body and its ring of teeth 838 can be moved axially between a first location shown in FIG. 10B and a second location shown in FIG. 10C. When the free end of the handle 866 is tilted away from the inner frame portion 824B so that the longitudinal axis $A_{13}$ of the handle changes in angle relative to the axis $A_{11}$, a portion of the handle 866 pushes on the head 871 while another portion of the handle 866 pushes on one of the interior surfaces 889 that defines one of the radial openings 887. Thus, in the system of FIGS. 10A–10C, tilting the free end of the handle 866 away from the inner frame portion 824B pushes the head 871 toward the inner frame portion 824B and pushed body 836 outwardly away from the outer frame portion 824A. One of the interior surfaces 889 serves as a fulcrum when the free end of the handle 866 is pulled away from the inner frame portion 824B as shown in FIG. 10C.

When the handle 866 is moved to the position shown at the left side of in FIG. 10C, the pawl 850 is disengaged so the operator can rotate the shaft 830 about the axis $A_{11}$ to unwind the chain attached to the spool. The operator thus can remotely disengage the pawl 850 and cause the shaft 830 to free-spool while working at in interior location within the vehicle. In the illustrated system, the head 871 has a larger diameter than the shaft 830 so the head 871 can serve as a spring retainer. The return spring 880 is located between the head 871 and the inner frame portion 824B to urge the shaft 830 and the body 836 to return to the first location.

The system shown in FIGS. 11A and 11b is similar to the system shown in FIGS. 10A–10D, but incorporates several useful modifications. The illustrated winch system is shown mounted to a frame 924 of a cargo carrying vehicle, in particular an automobile transport trailer. The cargo, for example automobiles, is secured to the transport vehicle by an elongated member (not shown). One end of the elongated member is secured to a winch spool 959. The other end of the elongated member is free so that the elongated member can be secured to the cargo, for example an automobile. Or the elongated member can extend over or around the cargo as previously described. Used in this second way, a winch can secure a cargo container or lumber, for example, to a railroad car, truck bed, or deck of a ship (not shown).

A shaft 930 is rotationally mounted relative to the frame 924. The shaft 930 can rotate about an axis $A_{14}$ of rotation to wrap the elongated member around the spool 959. The winch system has a drive system 934 secured to the shaft 930 to control the rotation of the shaft. Unlike the system of FIGS. 10A–10D, the spool 959 is not fixed relative to the shaft 930. FIG. 11A shows the spool 959 keyed to the shaft 930 by mating splines 991, 993 on the shaft and the spool respectively. The splines 991 mate with the splines 993 so that the spool 959 rotates with the shaft 930 and vice versa. The spline mounting arrangement allows the shaft 930 to move axially relatively to the spool 959, with the shaft sliding through an opening at the axis of the spool. The spool 959 is caged between two frame portions 924B and 924C so that the spool cannot travel a significant distance axially. Other mechanical arrangements could be used to key the spool 959 to the shaft 930 to achieve a similar result.

The drive system 934 has a body 936 having a generally cylindrical exterior surface 937 that is coaxial with the axis $A_{14}$. The surface 937 defines a ring or series of ratchet teeth 938 spaced around the axis $A_{14}$ at an even distance from the axis. The body 936 is mounted on the shaft 930 so that it cannot slide axially relative to the shaft 930 and cannot rotate relative to the shaft 930 such that, when the body 936 is rotated about the axis $A_{14}$, the shaft 930 also rotates. This conveniently is accomplished by welding the body 936 to an end of the shaft 930.

A pawl 950 is rotationally mounted on an inner portion of the frame 924A so that it can rotate about an axis between two positions. The pawl 950 is shown in an engaged position wherein the pawl engages the series of ratchet teeth 938 such that the shaft 930 can rotate only in one direction. A release handle (not shown) provided on the pawl 950 can be used to rotate the pawl about its axis to a disengaged position (not shown) wherein the pawl does not engage the series of ratchet teeth 938. When the pawl 950 is in the disengaged position, the shaft 930 can rotate in both directions. The pawl is similar to and operates much like the pawl 750 shown in FIGS. 9A–9D and described above.

When the body 936 is in the first location, the engaging edge of the pawl 950 is located between two of the teeth 938 and engages at least one of the teeth. When the body 936 is moved to a second location that is outwardly of the first location relative to outer frame portion 924A, the ring of teeth 938 is located so far outwardly from the outer frame portion 924A, that the engaging edge of the pawl 950 does not engage any of the teeth 938. Thus movement of the body 936 between its first and second locations causes the ring of teeth 938 to engage and disengage the engaging edge of the pawl. The engaging edge of the pawl 950 and/or the teeth 938 may be ramped to assist in the reengagement of the pawl and the teeth. Or a flange may be provided to support the pawl 950 as in the system shown in FIG. 9D.

The drive system 934 also has a handle-engaging portion 960. The illustrated handle-engaging portion 960 includes a series of radial openings 962 that are sized and shaped to receive a rod-like handle 966 that may be inserted by an operator through a pair of opposed openings 962. Each illustrated opening 962 has a length measured parallel to the axis $A_{14}$ and a width measured perpendicular to a plane (not shown) that bisects the opening and includes the axis $A_{14}$. The length is greater than the width. In the system shown in FIGS. 11A–11B, the length is considerably larger than the diameter of the handle 966, whereas the width is only slightly larger than the diameter of the handle 966. Thus, when a handle 966 is inserted into openings 962, the handle can move axially through the openings parallel to the axis $A_{14}$ to a limited extent, and can not rotate to any great extent relative to the body 936 about the axis $A_{14}$.

When a handle 966 is inserted into the body 936, the operator can use the handle to apply rotational force to the shaft 930. The force is transmitted from the handle 966 to the shaft 930 via the body 936. Thus, by applying a torquing force to the handle 966, the operator will urge the shaft 930 to rotate.

The handle 966 can also be used as a lever (first or second class depending on the direction of tilt) to transmit axially directed force that causes the body 936 to move from its first location to its second location. When the handle 966 is tilted toward or away from the outer frame portion 924A, so that the longitudinal axis $A_{15}$ of the handle changes in angle relative to the axis $A_{14}$, a portion of the handle 966 pushes on a ring 942 that extends around the body 936 and is secured to the outer frame portion 924A while another portion of the handle 966 pushes on an interior surface 964 that defines one of the radial openings 962. The illustrated ring 942 is generally cylindrical and is positioned coaxially with respect to the body 936, although other shapes and positions are possible. The ring defines a radially extending opening 969 through which a portion of the pawl, including the tooth-engaging edge, extends to engage the teeth 938. Thus, in the embodiment of FIGS. 11A and 11B, tilting the handle 966 toward or away from the outer frame portion 924A pulls the body 936 outwardly away from the frame and causes the ring of teeth 938 to move laterally relative to the outer frame portion 924A from its first location to its second location. (The ring 942 serves as a fulcrum when an end of the handle 966 is pulled away from the frame. Thus, when the handle 966 is moved in that way, it acts as a second class lever.)

When the free end of the handle 966 is moved toward or away from the outer frame portion 924A, the ring of teeth 938 is pulled away from the pawl 950 so that the pawl no longer engages any of the teeth 938. When the pawl 950 is thus disengaged, the operator can rotate the body 936 in either direction about the axis $A_{14}$. In turn, the shaft 930 rotates about the axis $A_{14}$ in the direction that the handle 966 is rotated. It thus can be seen that the operator can both disengage the pawl 950 and cause the shaft 930 to rotate while maintaining both hands firmly gripped on the handle 966.

A return spring 980 is provided to urge the shaft 930, body 936 and ring of teeth 938 to return to the first location. This is helpful to assure that the pawl 950 will normally engage the ring of teeth to prevent inadvertent free-spooling of the shaft 930. When an operator releases the handle 966, the spring 980 moves the body 936 back toward the outer frame portion 924A and the engaging edge of the pawl 950 is again received between two of the teeth 938.

A secondary rotational drive system is provided by the spool 959. The illustrated spool has a flange 995 that defines a plurality of radially extending openings 997. An operator working near the center of the vehicle can insert the handle 966 into one of the openings 997 and then use the handle to rotate the flange 995, which in turn rotates the rest of the spool 959 and the shaft 930.

The system of FIGS. 11A and 11D includes two quick release systems. A first quick release system 935 is conveniently located near the center of a vehicle at the opposite end of the shaft 930 from the drive system 934. The quick release system 935 can be used when an operator wants the shaft 930 to rotate freely, such as when the operator wants to unwind a chain, strap, or other extensible member that is wrapped around the spool 959.

The illustrated first quick release system 935 includes a head or button 971 welded or otherwise secured to the inner end of the shaft 930. The system 935 also has a handle-engaging portion 985 that extends around the head 971 and is secured to the inner frame portion 924B, for example by a weld. The illustrated handle-engaging portion 985 is generally cylindrical and includes a series of radial openings 987 that are defined by interior surfaces 989, are sized and shaped to receive the rod-like handle 966 that may be inserted by an operator through a pair of opposed openings 987, and are located outwardly of the head 971 relative to the inner frame portion 924B.

The handle 966 is useful to transmit axially directed force that causes the shaft 930 and the body 936 to move axially so that body and its ring of teeth 938 can be moved axially. When the free end of the handle 966 is tilted away from the inner frame portion 924B so that the longitudinal axis $A_{15}$ of the handle changes in angle relative to the axis $A_{14}$, a portion of the handle 966 pushes on the head 971 while another portion of the handle 966 pushes on one of the interior surfaces 989 that defines one of the radial openings 987. Thus, in the system of FIGS. 11A and 11B, tilting the free end of the handle 966 away from the inner frame portion 924B pushes the head 971 toward the inner frame portion 924B and pushed body 936 outwardly away from the outer frame portion 924A. One of the interior surfaces 989 serves as a fulcrum when the free end of the handle 966 is pulled away from the inner frame portion 924B.

When the handle 966 is used to move the head 971 toward the inner frame portion 924B, the pawl 950 is disengaged so the operator can rotate the shaft 930 about the axis $A_{14}$ to unwind the chain attached to the spool. The operator thus can remotely disengage the pawl 950 and cause the shaft 930 to free-spool while working at in interior location within the vehicle.

A second quick release system 998 is provided inside the vehicle near the outer frame portion 924A. The system includes a disk 999 fixed to the shaft 930, for example by a weld. The illustrated disk is round and coaxial with the shaft, although other arrangements are possible. An opening 1001 is provided through decking 924D or another appropriate frame portion at a location just inwardly, relative to the outer frame portion 924A, from the disk 999. As shown in FIG. 11B, an operator can use the handle 966 to transmit axially directed force that causes the shaft 930 and the body 936 to move axially so that body and its ring of teeth 938 can be moved axially. When the free end of the handle 966 is tilted away from the outer frame portion 924A to the position shown by broken lines in FIG. 11B so that the longitudinal axis $A_{15}$ of the handle changes in angle relative to the axis $A_{14}$, a portion of the handle 966 pushes on the disk 999 while another portion of the handle 966 pushes on one of the surface that defines the opening 1001. Thus, in the system of FIGS. 11A and 11B, tilting the free end of the handle 966 away from the outer frame portion 924A pushes the disk 999 toward the outer frame portion 924A and pushed body 936 outwardly away from the outer frame portion 924A. The interior surface that defines of the opening 1001 serves as a fulcrum when the free end of the handle 966 is pulled away from the outer frame portion 924A.

When the handle 966 is used to move the disk 999 toward the outer frame portion 924A, the pawl 950 is disengaged so the operator can rotate the shaft 930 about the axis $A_{14}$ to unwind the chain attached to the spool. The operator thus can remotely disengage the pawl 950 and cause the shaft 930 to free-spool while working at another location in interior of the vehicle.

In the illustrated system, the disk 999 also serves as a spring retainer. The return spring 980 is located between the disk 999 and the outer frame portion 924A to urge the shaft 930 and the body 936 to return to the first location.

Having illustrated and described the principles of the invention in preferred embodiments, it should be apparent to those skilled in the art that the invention can be modified in arrangement and detail without departing from such principles. In particular, a person of ordinary skill in the art will understand that, in many instances, the illustrated shapes and relationships of elements can be varied or the orientation of elements or groups of elements can be reversed, without altering their fundamental method of operation. For example, although the illustrated winch systems show a pawl pivotally mounted to a frame and an interacting ratchet wheel that rotates with a shaft, the elements could be reversed such that a ratchet wheel is mounted in a fixed position relative to a frame and interacts with a pawl carried by a member that rotates with a shaft. Accordingly, I claim all modifications coming within the spirit and scope of the following claims.

What is claimed is:

1. A manually driven winch system for use to rotate a shaft that is rotationally mounted on a frame, that has an axis of rotation, and that is adapted for attachment to an elongated flexible member so that the elongated flexible member can be wrapped around the shaft by rotating the shaft about the axis of rotation, the winch system comprising:

a drive system secured to the shaft to rotate the shaft about the axis of rotation, the drive system including (a) a series of ratchet teeth spaced around the axis, the drive system being connected to the shaft in such a manner that the series of ratchet teeth revolves around the axis as the shaft rotates and such that the series of ratchet teeth can move axially between a first location and a second location, and (b) a handle-engaging portion configured to transmit rotational force from a handle to the shaft to urge the shaft to rotate and configured to transmit axially directed force from the handle to cause the series of ratchet teeth to move from one of the locations to the other location; and a pawl that is mounted on the frame and that is positioned (a) to engage the series of ratchet teeth such that the shaft can rotate in only one direction when the series of ratchet teeth is in the first location and (b) such that the pawl does not engage the series of ratchet teeth so the shaft can rotate in both directions when the series of ratchet teeth is in the second location.

2. The manually driven winch system of claim 1 further comprising a handle adapted to engage the handle-engaging portion.

3. The manually driven winch system of claim 1 further comprising a spring positioned to urge the series of ratchet teeth toward the first location.

4. The manually driven winch system of claim 1 wherein the drive system includes a body having a surface shaped to provide the series of ratchet teeth.

5. The manually driven winch system of claim 1 wherein the pawl has a support member positioned to rest on outermost edges of the ratchet teeth when the series of ratchet teeth is in the second location.

6. The manually driven winch system of claim 1 further comprising a quick release mechanism that is operable to move the series of ratchet teeth from the first location to the second location and to hold the series of ratchet teeth in the second location.

7. The manually driven winch system of claim 1 further comprising at least one quick release system that includes:

a moveable handle-engaging member that is attached to the shaft for axial movement with the shaft and that has a handle-engaging surface positioned for engagement with a handle; and a fixed handle-engaging member that is located in a fixed position relative to the frame and that is configured to support a handle engaged with the fixed handle-engaging member so that the handle engaged with the fixed handle-engaging member can apply force to the handle-engaging surface of the moveable handle-engaging member to cause the shaft to move axially and cause the series of ratchet teeth to move from one of the locations to the other location.

8. The manually driven winch system of claim 7 wherein:

the moveable handle-engaging member is a head located at an end of the shaft; and the fixed handle-engaging member is configured to hold a portion of a handle in a position in relation to the frame such that the fixed handle-engaging member can serve as a fulcrum for a handle that is engaged with the fixed handle-engaging member while asserting force against the handle-engaging surface to move the shaft axially.

9. The manually driven winch system of claim 8 wherein the fixed handle-engaging member is generally cylindrical and defines a series of radial openings that are sized and shaped to receive a handle.

10. A vehicle for transporting cargo, the vehicle comprising:
a frame to support cargo; and
at least one manually operated winch system of claim 1.

11. A manually driven winch system comprising:
a frame;
a shaft that is rotationally mounted on the frame, that has an axis of rotation, and that is adapted for attachment to an elongated flexible member so that the elongated flexible member can be wrapped around the shaft by rotating the shaft about the axis of rotation;
a drive system secured to the shaft to rotate the shaft about the axis of rotation, the drive system including (a) a series of ratchet teeth spaced around the axis, the drive system being connected to the shaft in such a manner that the series of ratchet teeth revolves around the axis as the shaft rotates and such that the series of ratchet teeth can move axially between a first location and a second location, and (b) a handle-engaging portion configured to transmit rotational force from a handle to the shaft to urge the shaft to rotate and configured to transmit axially directed force from the handle to cause the series of ratchet teeth to move from one of the locations to the other location;
a pawl that is mounted on the frame and that is positioned (a) to engage the series of ratchet teeth such that the shaft can rotate in only one direction when the series of ratchet teeth is in the first location and (b) such that the pawl does not engage the series of ratchet teeth so the shaft can rotate in both directions when the series of ratchet teeth is in the second location; and
a fulcrum member that is located in a fixed position relative to the frame such that the fulcrum member can serve as a fulcrum for a handle that is engaged with the handle-engaging portion and operated to transmit axially directed force that causes the shaft to move axially.

12. The manually driven winch system of claim 11 wherein the fulcrum member extends outwardly from the frame and around the handle-engaging portion.

13. The manually driven winch system of claim 12 wherein the fulcrum member is a ring that:
is generally cylindrical and is generally coaxial with the handle-engaging portion; and
defines an opening through which at least a portion of the pawl extends to engage the ratchet teeth.

14. A manually driven winch system comprising:
a frame;
a shaft that is rotationally mounted on the frame, that has an axis of rotation, and that is adapted for attachment to an elongated flexible member so that the elongated flexible member can be wrapped around the shaft by rotating the shaft about the axis of rotation;
a drive system secured to the shaft to rotate the shaft about the axis of rotation, the drive system including (a) a series of ratchet teeth spaced around the axis, the drive system being connected to the shaft in such a manner that the series of ratchet teeth revolves around the axis as the shaft rotates and such that the series of ratchet teeth can move axially between a first location and a second location, and (b) a handle-engaging portion configured to transmit rotational force from a handle to the shaft to urge the shaft to rotate and configured to transmit axially directed force from the handle to cause the series of ratchet teeth to move from one of the locations to the other location;
a pawl that is mounted on the frame and that is positioned (a) to engage the series of ratchet teeth such that the shaft can rotate in only one direction when the series of ratchet teeth is in the first location and (b) such that the pawl does not engage the series of ratchet teeth so the shaft can rotate in both directions when the series of ratchet teeth is in the second location; and
at least one quick release system that includes a moveable handle-engaging member that is a radially extending disk attached to the shaft for axial movement with the shaft and that has a handle-engaging surface positioned for engagement by a handle and a fixed handle-engaging member that is a portion of the frame that defines an opening that is shaped to receive a portion of a handle and that is positioned in relation to the disk such that the fixed handle-engaging member can serve as a fulcrum for a handle that is engaged with the fixed handle-engaging member while asserting force against the handle-engaging surface of the disk to move the shaft axially and cause the series of ratchet teeth to move from one of the locations to the other location.

15. The manually driven winch system of claim 14 wherein:
the fixed handle-engaging member is decking material that defines at least one opening that is sized and shaped to receive a handle; and
the disk is located between the ends of the shaft and is concentric to the shaft.

16. A vehicle for transporting, the vehicle comprising:
a frame to support cargo; and
one or more manually operated winch systems, at least one of which comprises (a) a shaft that is rotationally mounted on the frame, (b) a flexible elongated member adapted to engage the cargo and secure the cargo to the frame, the elongated member being connected to the shaft so that the elongated flexible member can be wrapped around the shaft by rotating the shaft to remove slack in the elongated member and exert force on the cargo, (c) a drive system secured to the shaft to rotate the shaft about an axis of rotation, the drive system including a series of ratchet teeth spaced around the axis, the drive system being connected to the shaft in such a manner that the series of ratchet teeth revolves around the axis as the shaft rotates and such that the series of ratchet teeth can move axially between a first location and a second location, and a handle-engaging portion configured to transmit rotational force from a handle to the shaft to urge the shaft to rotate and configured to transmit axially directed force from the handle to cause the series of ratchet teeth to move from one of the locations to the other location, (d) a pawl mounted on the frame that supports the shaft, the pawl being positioned to engage the series of ratchet teeth such that the shaft can rotate in only one direction when the series of ratchet teeth is in the first location and such that the pawl does not engage the series of ratchet teeth so the shaft can rotate in both directions when the series of ratchet teeth is in the second location, and (e) at least one quick release system that includes a moveable handle-engaging member that is attached to the shaft for axial movement with the shaft and that has a handle-engaging surface positioned for engagement by a handle and a fixed handle-engaging member that is located in a fixed position relative to the frame and that is configured to support a handle engaged with the fixed handle-engaging member so that the handle engaged with the fixed handle-engaging member can apply force to the handle-engaging surface of the moveable handle-engaging member to cause the shaft to move axially and cause the series of ratchet teeth to move from one of the locations to the other location.

17. A manually driven winch system comprising:

a frame;

a shaft that is rotationally mounted on the frame, that has an axis of rotation, and that is adapted for attachment to an elongated flexible member so that the elongated flexible member can be wrapped around the shaft by rotating the shaft about the axis of rotation;

a drive system secured to the shaft to rotate the shaft about the axis of rotation, the drive system including a series of ratchet teeth spaced around the axis, the drive system being connected to the shaft in such a manner that the series of ratchet teeth revolves around the axis as the shaft rotates and such that the series of ratchet teeth can move axially between a first location and a second location, and a handle-engaging portion configured to transmit rotational force from a handle to the shaft to urge the shaft to rotate;

a pawl that is mounted on the frame and that is positioned to engage the series of ratchet teeth such that the shaft can rotate in only one direction when the series of ratchet teeth is in the first location and such that the pawl does not engage the series of ratchet teeth so the shaft can rotate in both directions when the series of ratchet teeth is in the second location; and at least one quick release system that includes a moveable handle-engaging member that is attached to the shaft for axial movement with the shaft and that has a handle-engaging surface positioned for engagement by a handle and a fixed handle-engaging member that is located in a fixed position relative to the frame and that is configured to support a handle engaged with the fixed handle-engaging member so that the handle engaged with the fixed handle-engaging member can apply axially directed force to the handle-engaging surface of the moveable handle-engaging member to cause the shaft to move axially and cause the series of ratchet teeth to move from one of the locations to the other location.

18. A vehicle for transporting cargo, the vehicle comprising:

a frame to support cargo; and at least one manually driven winch system of claim 17.

* * * * *